US012080962B2

(12) United States Patent
Koga et al.

(10) Patent No.: US 12,080,962 B2
(45) Date of Patent: Sep. 3, 2024

(54) ANTENNA APPARATUS AND WIRELESS COMMUNICATION APPARATUS

(71) Applicant: FCNT LIMITED, Yamato (JP)

(72) Inventors: Yohei Koga, Yamato (JP); Tabito Tonooka, Yamato (JP); Satoshi Sakita, Yamato (JP); Yasumitsu Ban, Yamato (JP); Manabu Yoshikawa, Yamato (JP); Takahiro Shinojima, Yamato (JP)

(73) Assignee: FCNT LLC, Yamato (JP)

( * ) Notice: Subject to any disclaimer, the term of this patent is extended or adjusted under 35 U.S.C. 154(b) by 135 days.

(21) Appl. No.: 17/718,480

(22) Filed: Apr. 12, 2022

(65) Prior Publication Data

US 2022/0239006 A1 Jul. 28, 2022

Related U.S. Application Data

(63) Continuation of application No. PCT/JP2019/040504, filed on Oct. 15, 2019.

(51) Int. Cl.
*H01Q 9/42* (2006.01)
*H01Q 1/24* (2006.01)
*H01Q 9/04* (2006.01)

(52) U.S. Cl.
CPC ............... *H01Q 9/42* (2013.01); *H01Q 1/243* (2013.01); *H01Q 9/0414* (2013.01)

(58) Field of Classification Search
CPC ......... H01Q 9/42; H01Q 1/243; H01Q 9/0414
See application file for complete search history.

(56) References Cited

U.S. PATENT DOCUMENTS 3,824,599 A * 7/1974 Haswell ................. H03H 7/466 343/822
5,146,232 A * 9/1992 Nishikawa ............... H01Q 9/40 343/829

(Continued)

FOREIGN PATENT DOCUMENTS

JP 3-253106 A 11/1991
JP 2011-520345 A 7/2011

(Continued)

OTHER PUBLICATIONS

Sun et al., A Very Small Folded-spiral Monopole for Handheld Devices, 2005, IEEE 0-7803-8883-6/05 (Year: 2005).*

(Continued)

*Primary Examiner* — Ricardo I Magallanes
*Assistant Examiner* — Jordan E. DeWitt
(74) *Attorney, Agent, or Firm* — WHDA, LLP

(57) ABSTRACT

An antenna apparatus includes a ground substrate, a feeding point provided on the ground substrate, a first conductor device of which one end is electrically connected to the feeding point and which has a plate shape being parallel to the ground substrate, a second conductor device which is arranged between the first conductor device and the ground substrate, of which one end is electrically connected to the ground substrate, and which has a plate shape being parallel to the ground substrate and a connecting portion which electrically connects another end of the first conductor device and another end of the second conductor device to each other. A width of the first conductor device is wider than a width of the second conductor device. Lengths of the first conductor device and the second conductor device are ½ of a wavelength of a radio wave for operating the antenna apparatus.

12 Claims, 34 Drawing Sheets

(56) References Cited

U.S. PATENT DOCUMENTS

| | | | | |
|---|---|---|---|---|
| 7,224,318 | B2 * | 5/2007 | Mikami | H01Q 1/3275 343/789 |
| 10,403,971 | B2 * | 9/2019 | Yu | H01Q 1/48 |
| 2002/0041256 | A1 * | 4/2002 | Saitou | H01Q 9/30 343/702 |
| 2003/0001781 | A1 * | 1/2003 | Konishi | H01Q 1/362 343/702 |
| 2004/0150567 | A1 * | 8/2004 | Yuanzhu | H01Q 1/3291 343/895 |
| 2005/0153756 | A1 * | 7/2005 | Sato | H01Q 5/371 455/575.1 |
| 2006/0132362 | A1 * | 6/2006 | Yuanzhu | H01Q 13/10 343/700 MS |
| 2008/0284670 | A1 * | 11/2008 | Kanno | H01Q 13/106 343/767 |
| 2009/0167614 | A1 * | 7/2009 | Takaki | H01Q 9/42 343/702 |
| 2009/0207089 | A1 * | 8/2009 | Yoshioka | H01Q 21/30 343/846 |
| 2009/0273536 | A1 * | 11/2009 | Kitchener | H01Q 9/36 343/848 |
| 2010/0171676 | A1 * | 7/2010 | Tani | H01Q 1/36 343/803 |
| 2011/0183633 | A1 * | 7/2011 | Ohba | H01Q 5/314 343/722 |
| 2012/0007787 | A1 * | 1/2012 | Schantz | G01S 5/14 343/788 |
| 2012/0194392 | A1 * | 8/2012 | Inoue | H01Q 1/243 343/700 MS |
| 2012/0200461 | A1 * | 8/2012 | Lee | H01Q 9/42 343/700 MS |
| 2012/0274517 | A1 * | 11/2012 | Nagoshi | H01Q 5/357 343/700 MS |
| 2012/0274537 | A1 | 11/2012 | Kitchener et al. | |
| 2013/0063318 | A1 * | 3/2013 | Yurugi | H01Q 5/371 343/729 |
| 2013/0162498 | A1 | 6/2013 | Kitchener et al. | |
| 2013/0234899 | A1 * | 9/2013 | Pope | H01Q 1/526 343/702 |
| 2014/0071000 | A1 * | 3/2014 | Tani | H01Q 9/42 343/700 MS |
| 2014/0220906 | A1 | 8/2014 | Ohba et al. | |
| 2017/0125919 | A1 * | 5/2017 | Chien | H01Q 9/0414 |
| 2017/0222305 | A1 * | 8/2017 | Liu | H01Q 13/10 |
| 2018/0145410 | A1 * | 5/2018 | Ban | H01Q 9/0421 |
| 2018/0175479 | A1 * | 6/2018 | Hasaba | H01Q 5/378 |
| 2019/0044239 | A1 * | 2/2019 | Sonoda | H01Q 9/30 |
| 2022/0239006 | A1 * | 7/2022 | Koga | H01Q 5/371 |

FOREIGN PATENT DOCUMENTS

| | | |
|---|---|---|
| JP | 2016-165035 A | 9/2016 |
| WO | 2011/024280 A1 | 3/2011 |

OTHER PUBLICATIONS

International Search Report dated Dec. 17, 2019, issued in counterpart International Application No. PCT/ JP2019/040504 (1 page).

* cited by examiner

FIG. 11

| ANTENNA | RADIATION EFFICIENCY (dB) |
|---|---|
| FIRST COMPARATIVE EXAMPLE | -4.5 |
| EMBODIMENT | -3.0 |
| EMBODIMENT & PIECE OF METAL IN VICINITY OF FOLDING PORTION | -2.6 |
| EMBODIMENT & PIECE OF METAL IN VICINITY OF FOLDING PORTION & PIECE OF METAL IN VICINITY OF FEEDING POINT | -2.7 |

FIG. 12

| ANTENNA | RADIATION EFFICIENCY (dB) |
|---|---|
| SECOND COMPARATIVE EXAMPLE | -4.9 |
| FOURTH COMPARATIVE EXAMPLE | -4.3 |
| FOURTH COMPARATIVE EXAMPLE & PIECE OF METAL IN VICINITY OF FOLDING PORTION | -4.8 |
| FOURTH COMPARATIVE EXAMPLE & PIECE OF METAL IN VICINITY OF FOLDING PORTION & PIECE OF METAL IN VICINITY OF FEEDING POINT | -4.7 |

FIG. 13

| ANTENNA | RADIATION EFFICIENCY (dB) |
|---|---|
| FIRST COMPARATIVE EXAMPLE | -4.5 |
| FIFTH COMPARATIVE EXAMPLE | -4.2 |
| FIFTH COMPARATIVE EXAMPLE & PIECE OF METAL IN VICINITY OF FOLDING PORTION | -4.4 |
| FIFTH COMPARATIVE EXAMPLE & PIECE OF METAL IN VICINITY OF FOLDING PORTION & PIECE OF METAL IN VICINITY OF FEEDING POINT | -4.1 |

FIG. 14

| ANTENNA | RADIATION EFFICIENCY (dB) |
|---|---|
| THIRD COMPARATIVE EXAMPLE | -4.3 |
| THIRD COMPARATIVE EXAMPLE & PIECE OF METAL IN VICINITY OF FOLDING PORTION | -4.8 |
| THIRD COMPARATIVE EXAMPLE & PIECE OF METAL IN VICINITY OF FOLDING PORTION & PIECE OF METAL IN VICINITY OF FEEDING POINT | -4.7 |

FIG. 15

| WIDTH OF FIRST CONDUCTOR DEVICE: WIDTH OF SECOND CONDUCTOR DEVICE | RADIATION EFFICIENCY (dB) |
|---|---|
| 5:1 | -2.7 |
| 4:1 | -2.9 |
| 3:1 | -3.2 |
| 2:1 | -3.7 |
| 1:1 | -4.2 |

ANTENNA APPARATUS AND WIRELESS COMMUNICATION APPARATUS

CROSS-REFERENCE TO RELATED APPLICATION

This application is a continuation application of International Application PCT/JP2019/040504 filed on Oct. 15, 2019 and designated the U.S., the entire contents of which are incorporated herein by reference.

FIELD

The embodiments discussed herein are related to an antenna apparatus and a wireless communication apparatus.

BACKGROUND

There are demands for higher efficiency of antennas in wireless communication apparatuses such as vehicles equipped with car-mounted antennas, smartphones, tablet computers, and mobile phones.

For example, Japanese Laid-open Patent Publication No. 2016-165035 discloses a monopole antenna with a folded shape. With the monopole antenna, a conductor device preceding the fold and a conductor device after the fold are both provided on a same plane (at a same height from a ground pattern). In the monopole antenna, impedance adjustment of the antenna in a case of a downsized ground pattern is achieved by increasing a linewidth after being connected to the ground pattern and before being folded.

DOCUMENT OF PRIOR ART

Patent Document

[Patent document 1] Japanese Laid-open Patent Publication No. 2016-165035

SUMMARY

According to an aspect of the embodiments, an antenna apparatus includes: a ground substrate; a feeding point provided on the ground substrate; a first conductor device of which one end is electrically connected to the feeding point and which has a plate shape being parallel to the ground substrate; a second conductor device which is arranged between the first conductor device and the ground substrate, of which one end is electrically connected to the ground substrate, and which has a plate shape being parallel to the ground substrate; and a connecting portion which electrically connects another end of the first conductor device and another end of the second conductor device to each other, wherein a width of the first conductor device is wider than a width of the second conductor device.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIG. 11 is a diagram showing a result of a first evaluation;

FIG. 12 is a diagram showing a result of a second evaluation;

FIG. 13 is a diagram showing a result of a third evaluation;

FIG. 14 is a diagram showing a result of a fourth evaluation;

FIG. 15 is a diagram illustrating a relationship between a ratio of widths of the first conductor device and the second conductor device and radiation efficiency;

DESCRIPTION OF EMBODIMENTS

Figure 1:
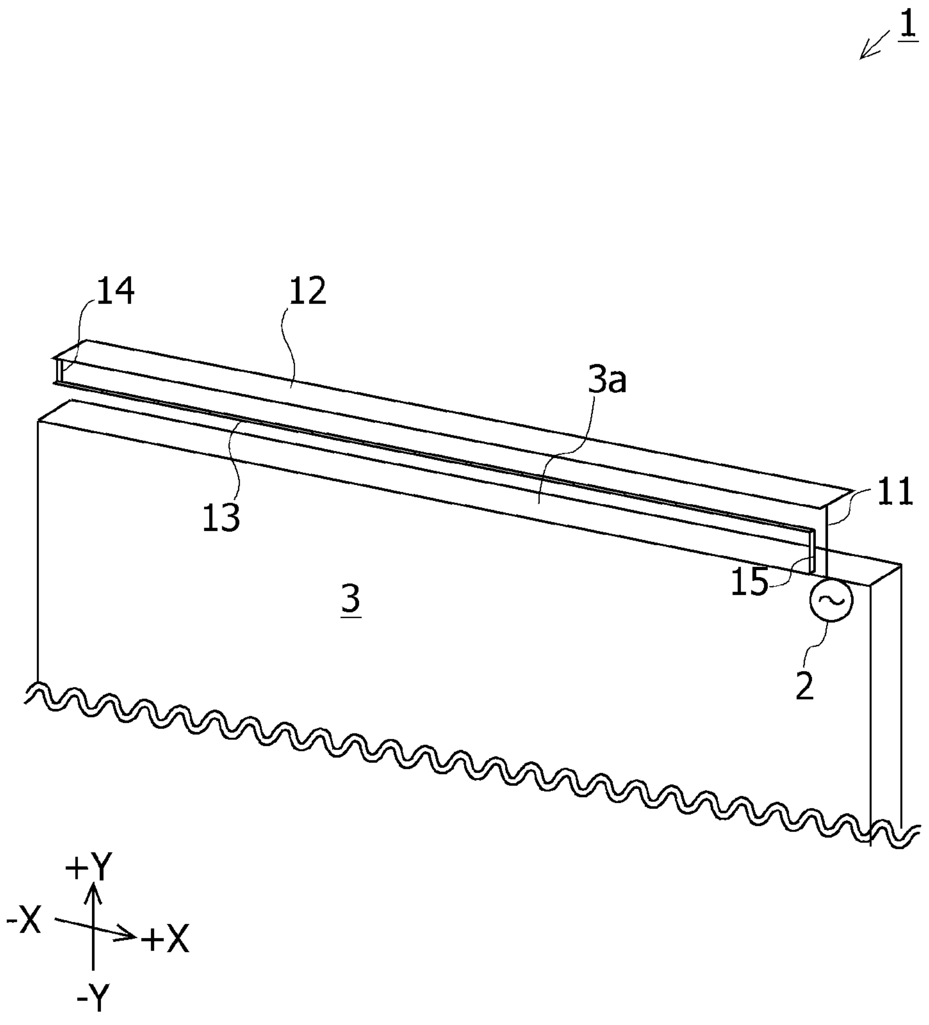
FIG. 1 is a perspective view showing an example of an antenna according to an embodiment.

With conventional antennas, there is a problem in that the presence of metal in a vicinity of an antenna reduces radiation efficiency of the antenna due to an effect of the metal.

An aspect of the embodiments relates to an antenna apparatus which suppresses a reduction in radiation efficiency of an antenna even when metal is present in a vicinity of the antenna and a wireless communication apparatus which is mounted with the antenna apparatus.

Hereinafter, an embodiment will be described. It is to be understood that configurations of the embodiment described below are illustrative and that the disclosed technique is not limited to the configurations of the embodiment. For example, an antenna apparatus according to the present embodiment is configured as described below.

The antenna apparatus according to the present embodiment includes:

a ground substrate;

a feeding point provided on the ground substrate;

a first conductor device of which one end is electrically connected to the feeding point and which has a plate shape being parallel to the ground substrate;

a second conductor device which is arranged between the first conductor device and the ground substrate, of which one end is electrically connected to the ground substrate, and which has a plate shape being parallel to the ground substrate; and a connecting portion which electrically connects another end of the first conductor device and another end of the second conductor device to each other, wherein a width of the first conductor device is wider than a width of the second conductor device, and lengths of the first conductor device and the second conductor device are ½ of a wavelength of a radio wave for operating the antenna apparatus.

The ground substrate is a grounded substrate. The second conductor device is grounded by being electrically connected to the ground substrate. The second conductor device is arranged between the first conductor device and the ground substrate. In other words, the first conductor device and the second conductor device are arranged so as to overlap with each other in a plan view. Since the first conductor device is connected to a feeding point and the first conductor device is formed wider than the second conductor device, a stronger current tends to flow through the first conductor device than the second conductor device. Therefore, a current of which an orientation is opposite to that of the current flowing through the first conductor device also flows through the ground substrate. The orientation of the current with an opposite orientation to the current flowing through the first conductor device is a current with a same orientation as that of the current flowing through the second conductor device. Therefore, a current of which an orientation is opposite to that of the current flowing through the second conductor device on the ground substrate is weakened. An antenna apparatus with such features is capable of reducing a decline in radiation efficiency of an antenna due to heat loss. In addition, as will be explained in the present specification, even when metal is present in a vicinity of the antenna apparatus, a reduction in radiation efficiency of the antenna apparatus can be suppressed and, at the same time, a further improvement in radiation efficiency can also be expected.

In addition, a length of the connecting portion may be set to 1/50 or less of the wavelength of the radio wave for operating the antenna apparatus. In other words, by defining the length of the connecting portion in this manner, an interval between the first conductor device and the second conductor device may also be set to 1/50 or less of the wavelength of the radio wave for operating the antenna apparatus.

The present antenna apparatus may further include the following feature. At least one of an inductor and a capacitor is provided between the feeding point and the first conductor device. The antenna apparatus with such a feature can change a frequency which causes the antenna apparatus to resonate by appropriately adjusting a capacitance of the capacitor or an inductance of the inductor without changing physical lengths of the first conductor device and the second conductor device. In addition, the inductor or the capacitor may be provided between the second conductor device and the ground substrate.

The present antenna apparatus may further include the following feature. The antenna apparatus is mounted to a mobile terminal apparatus and at least a part of the first conductor device is formed by a metal frame which constitutes an exterior of the mobile terminal apparatus. By using a metal external frame which constitutes an exterior of the mobile terminal apparatus as at least a part of the first conductor device, the antenna apparatus with such a feature can reduce an area occupied by the antenna apparatus in a region defined by the metal frame. Therefore, the antenna apparatus with such a feature enables the mobile terminal apparatus to be downsized or enable a larger number of electronic components to be mounted to the mobile terminal apparatus. In addition, at least a part of the second conductor device may be formed using Laser Direct Structuring (LDS) or a flexible substrate.

The present antenna apparatus may further include the following feature. At least one of the first conductor device and the second conductor device is formed in a meander shape. By giving at least one of the first conductor device and the second conductor device a meander shape, the antenna apparatus can be further downsized.

The present antenna apparatus may further include the following feature. The antenna apparatus may further include a third conductor device which is connected to the other end of the first conductor device and which has a plate shape being parallel to the ground substrate, wherein a length of the third conductor device may be ¼ or less of a wavelength of a radio wave for operating the third conductor device as an antenna. In addition, the antenna apparatus may further include a fourth conductor device being connected to the ground substrate, wherein a length of the fourth conductor device may be ¼ or less of a wavelength of a radio wave for operating the fourth conductor device as an antenna. By having such features, the antenna apparatus can operate at a plurality of frequencies (multiband).

The present antenna apparatus may further include the following feature. A grounded metal member is further provided at a distance of 1/50 or less of the wavelength of the radio wave for operating the antenna apparatus from at least one of the one end of the first conductor device and the connecting portion. By providing the metal member in a vicinity of at least one of the one end of the first conductor device (a location connected to the feeding point) and the connecting portion, the radiation efficiency of the present antenna apparatus can be increased.

In addition, the disclosed technique may be a wireless communication apparatus mounted with an antenna apparatus having any of the features described above. In the present wireless communication apparatus, the metal member may be an exterior of the wireless communication apparatus.

Embodiment

Hereinafter, an embodiment will be further described with reference to the drawings. FIG. 1 is a perspective view showing an example of an antenna according to the embodiment. An antenna 1 includes a feed line 11, a first conductor device 12, a second conductor device 13, a folding portion 14, a ground line 15, and a ground substrate 3. Hereinafter, in the present specification, a near side on a right-hand side of FIG. 1 will be referred to as a +X direction, a far side on a left-hand side of FIG. 1 will be referred to as a −X direction, above in FIG. 1 will be referred to as a +Y direction, and below in FIG. 1 will be referred to as a −Y direction.

The ground substrate 3 is a substrate including a grounded ground surface 3*a*. The ground substrate 3 also includes the feeding point 2 for feeding power to the antenna 1. The ground substrate 3 may be a printed substrate to which various electronic components are to be mounted. An entire surface of the ground substrate 3 may constitute the ground surface 3*a*.

The first conductor device 12 is a conductor device which is formed in a flat shape parallel to the ground surface 3*a*. A +X-side end of the first conductor device 12 is connected to the feeding point 2 by the feed line 11 and the folding portion 14 is connected to a −X-side end thereof. A length (a length from the +X-side end to the −X-side end) of the first conductor device 12 is ½ or less (for example, 0.43λ) of a wavelength λ of a radio wave which resonates the antenna 1. The second conductor device 13 is arranged between the first conductor device 12 and the ground surface 3*a*.

The second conductor device 13 is a conductor device which is formed in a flat shape parallel to the ground surface 3*a*. A −X-side end of the second conductor device 13 is connected to a −X-side end of the first conductor device 12 by the folding portion 14. A +X-side end of the second conductor device 13 is grounded by being connected to the ground surface 3*a* of the ground substrate 3 via the ground line 15. A width of the second conductor device 13 is formed narrower than a width of the first conductor device 12. The width of the second conductor device 13 is, for example, 1/5 of the width of the first conductor device 12. In addition, a distance between the first conductor device 12 and the second conductor device 13 in the Y direction is preferably 1/50 or less of the wavelength λ of the radio wave which resonates the antenna 1.

The folding portion 14 is a conductor device which extends from the −X-side end of the first conductor device 12 toward the −X-side end of the second conductor device 13. The first conductor device 12 and the second conductor device 13 are electrically connected to each other by the folding portion 14.

Figure 2:
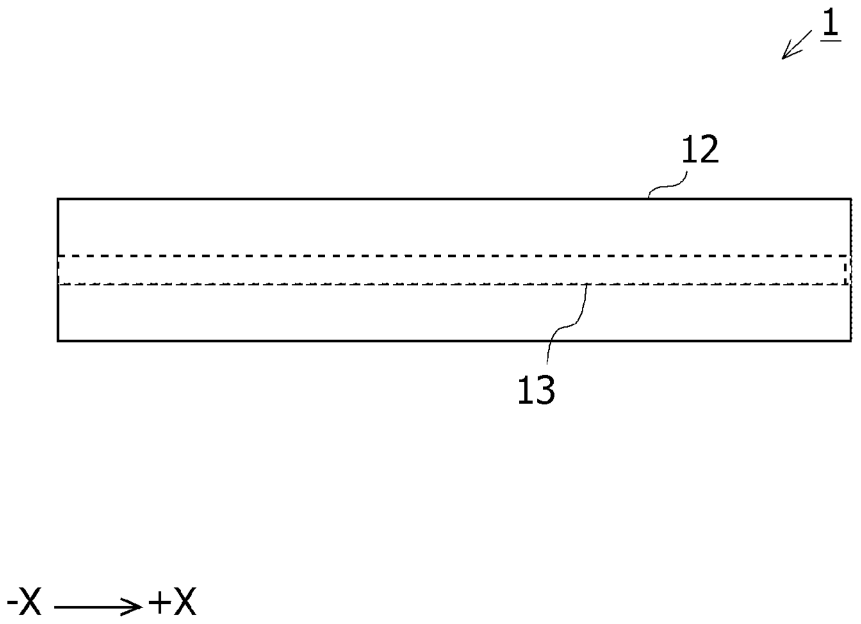
FIG. 2 is a diagram illustrating a positional relationship between a first conductor device and a second conductor device in a plan view of the antenna according to the embodiment from a +Y direction.

FIG. 2 is a diagram illustrating a positional relationship between the first conductor device and the second conductor device in a plan view of the antenna according to the embodiment from the +Y direction. In FIG. 2, the second conductor device 13 is shown by a dotted line. A center line that extends in a longitudinal direction of the first conductor device 12 and a center line that extends in a longitudinal direction of the second conductor device 13 overlap with each other in a plan view. An end in the −X direction of the first conductor device 12 and an end in the −X direction of the second conductor device 13 overlap with each other in a plan view. In addition, the second conductor device 13 is arranged so that an end in the +X direction of the second conductor device 13 approaches an end in the +X direction of the first conductor device 12 as much as possible. In other words, a length of the second conductor device 13 is designed so as to approach a length of the first conductor device 12 as much as possible. Therefore, the length of the first conductor device 12 can be described a length of the antenna 1.

First Comparative Example

Figure 3:
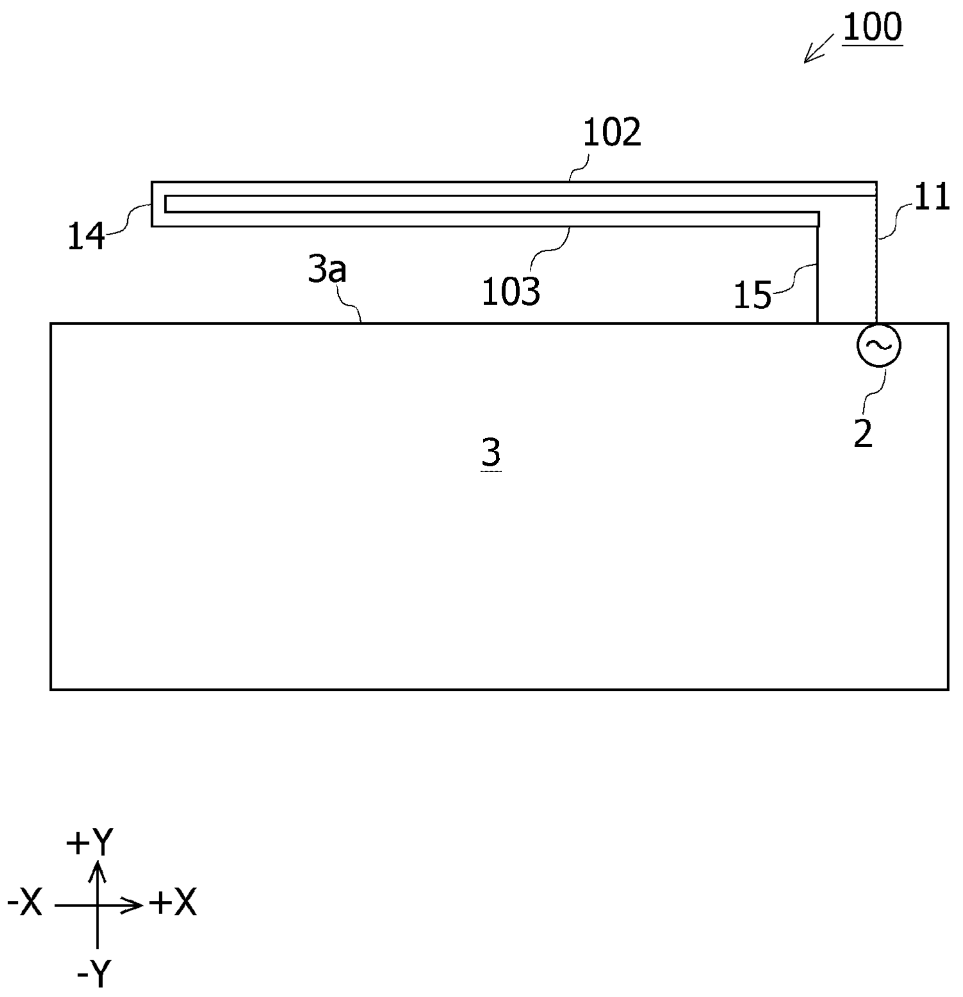
FIG. 3 is a side view showing an example of an antenna according to a first comparative example.

Comparative examples will now be considered. FIG. 3 is a side view showing an example of an antenna according to a first comparative example. An antenna 100 illustrated in FIG. 3 includes the feed line 11, a first conductor device 102, a second conductor device 103, the folding portion 14, the ground line 15, and the ground substrate 3. The antenna 100 differs from the antenna 1 according to the embodiment in that a width of the first conductor device 102 and a width of the second conductor device 103 are equal to each other due to the first conductor device 102 and the second conductor device 103 being formed in a linear shape instead of a plate shape.

Second Comparative Example

Figure 4:
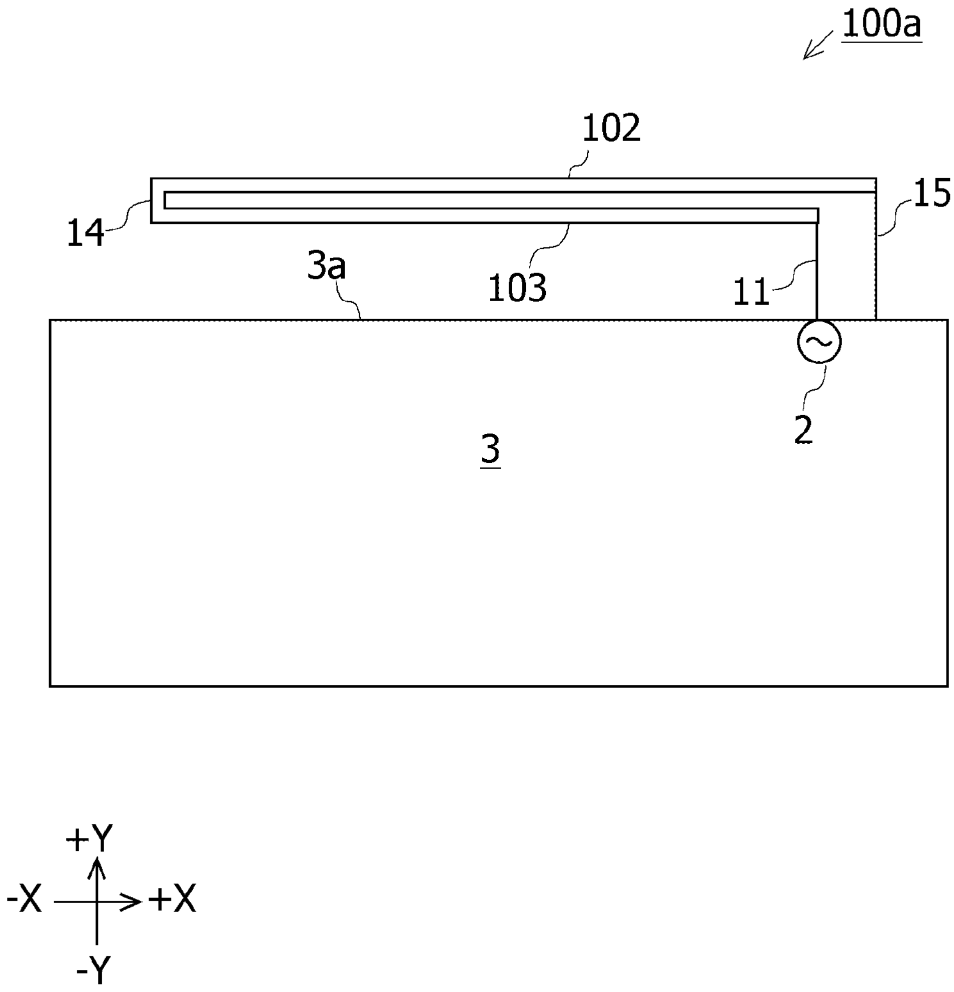
FIG. 4 is a side view showing an example of an antenna according to a second comparative example.

FIG. 4 is a side view showing an example of an antenna according to a second comparative example. An antenna 100*a* illustrated in FIG. 4 includes the feed line 11, the first conductor device 102, the second conductor device 103, the folding portion 14, the ground line 15, and the ground substrate 3. The antenna 100*a* differs from the antenna 100 according to the first comparative example in that the first conductor device 102 is grounded by being connected to the ground surface 3*a* of the ground substrate 3 by the ground line 15 and the second conductor device 103 is connected to the feeding point 2 by the feed line 11. In other words, the antenna 100*a* can be described an antenna created by swapping the feeding point and the ground of the antenna 100.

Third Comparative Example

Figure 5:
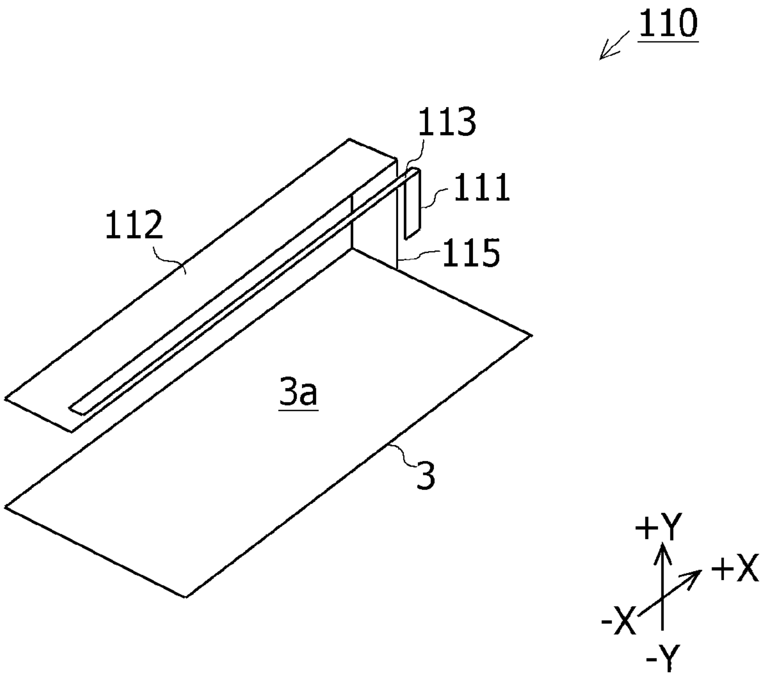
FIG. 5 is a diagram showing an example of an antenna according to a third comparative example.

FIG. 5 is a diagram showing an example of an antenna according to a third comparative example. An antenna 110 illustrated in FIG. 5 includes a feed line 111, a first conductor device 112, a second conductor device 113, a folding portion 114, a ground line 115, and the ground substrate 3. The antenna 110 differs from the antenna 1 according to the embodiment in that a distance between the first conductor device 112 and the ground surface 3*a* of the ground substrate 3 and a distance between the second conductor device 113 and the ground surface 3$a$ are equal to each other, the first conductor device 112 is connected to the ground surface 3$a$ via the ground line 115, and the second conductor device 113 which is formed thinner than the first conductor device 112 is fed power from a feeding point (not illustrated) via the feed line 111. Note that the antenna 110 according to the third comparative example is the antenna described in Japanese Patent Application Laid-open No. 2016-165035.

Fourth Comparative Example

Figure 6:
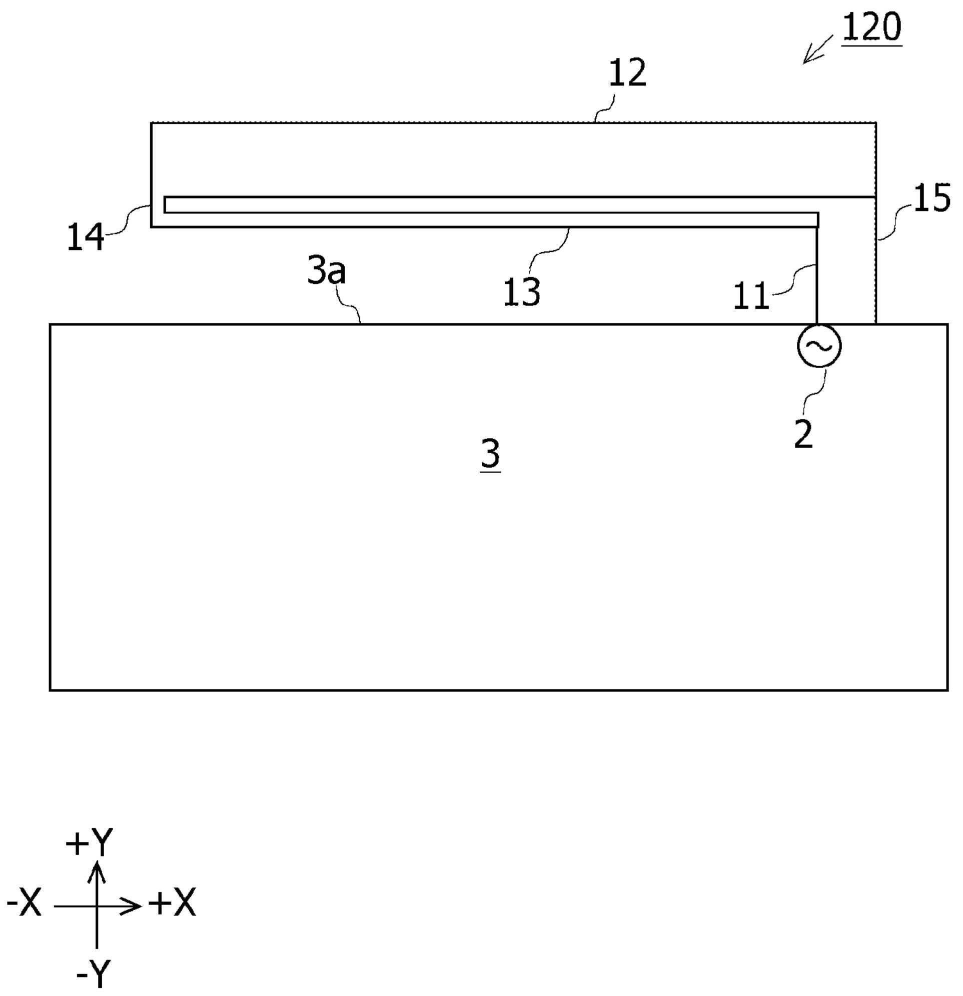
FIG. 6 is a side view schematically showing an example of an antenna according to a fourth comparative example.

FIG. 6 is a side view schematically showing an example of an antenna according to a fourth comparative example. An antenna 120 illustrated in FIG. 6 includes the feed line 11, the first conductor device 12, the second conductor device 13, the folding portion 14, the ground line 15, and the ground substrate 3. In FIG. 6, widths of the first conductor device 12 and the second conductor device 13 are schematically shown by being replaced with heights of the first conductor device 12 and the second conductor device 13. The antenna 120 differs from the antenna 1 according to the embodiment in that the first conductor device 12 is grounded by being connected to the ground surface 3$a$ of the ground substrate 3 by the ground line 15 and the second conductor device 13 is connected to the feeding point 2 by the feed line 11. In other words, the antenna 120 can be described an antenna created by swapping the feeding point and the ground of the antenna 1.

Fifth Comparative Example

Figure 7:
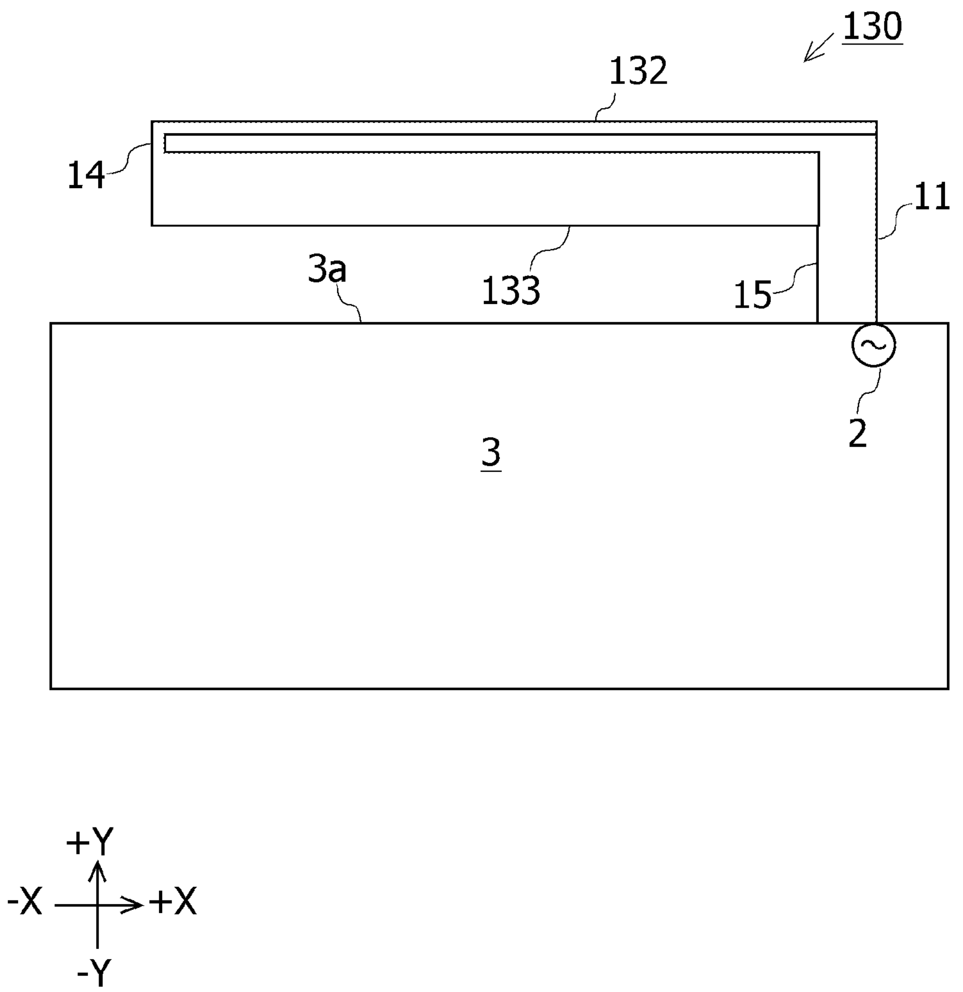
FIG. 7 is a side view schematically showing an example of an antenna according to a fifth comparative example.

FIG. 7 is a side view schematically showing an example of an antenna according to a fifth comparative example. An antenna 130 illustrated in FIG. 7 includes the feed line 11, a first conductor device 132, a second conductor device 133, the folding portion 14, the ground line 15, and the ground substrate 3. In FIG. 7, widths of the first conductor device 132 and the second conductor device 133 are schematically shown by being replaced with heights of the first conductor device 132 and the second conductor device 133 in a similar manner to FIG. 6. The antenna 130 differs from the antenna 1 according to the embodiment in that a width of the second conductor device 133 is five times a width of the first conductor device 132.

Radiation Efficiency of Antennas

Radiation efficiency of the antenna 1 according to the embodiment and the antennas according to the comparative examples was evaluated. In the present evaluation, conductivity of the feed line 11, the first conductor device, the second conductor device, the folding portion, and the ground line was set to $5.8\times10^5$ S/m and a distance between the first conductor device and the ground surface 3$a$ was set to $\lambda/30$.

Figure 8:
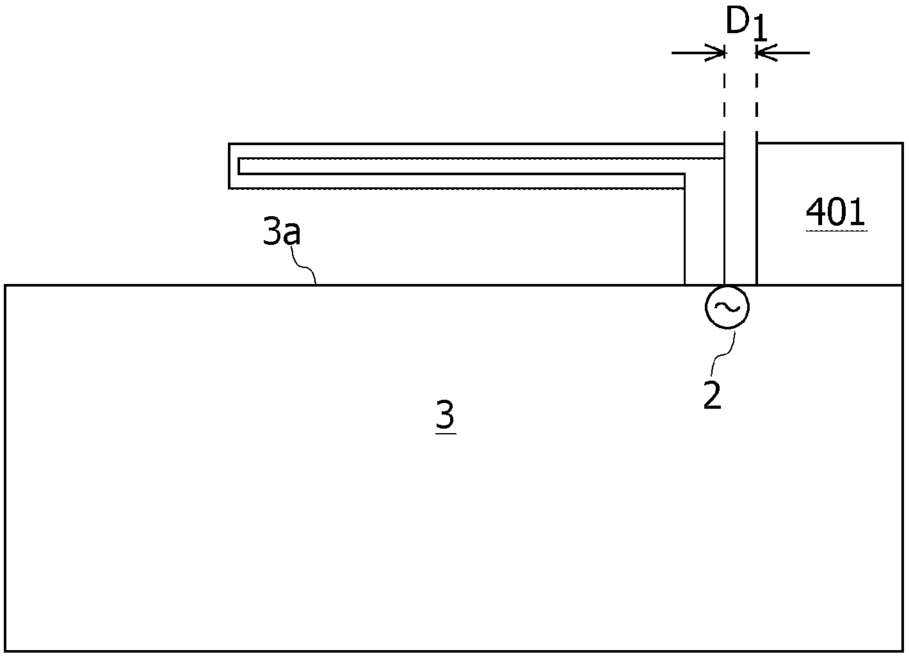
FIG. 8 is a diagram illustrating a state in which a piece of metal is placed in a vicinity of a feeding point of an antenna.
Figure 9:
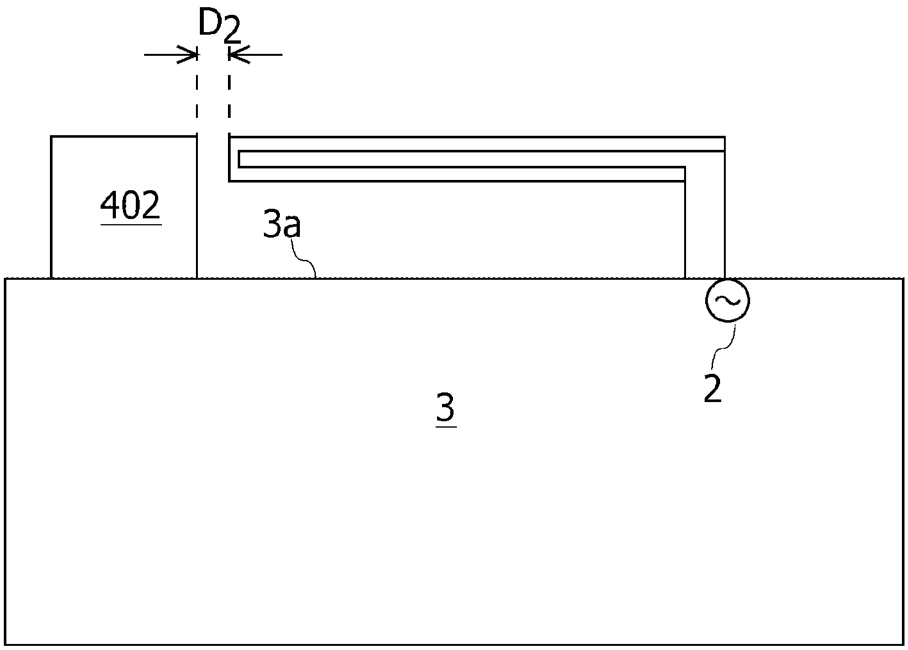
FIG. 9 is a diagram illustrating a state in which a piece of metal is placed in a vicinity of a folding portion of the antenna.
Figure 10:
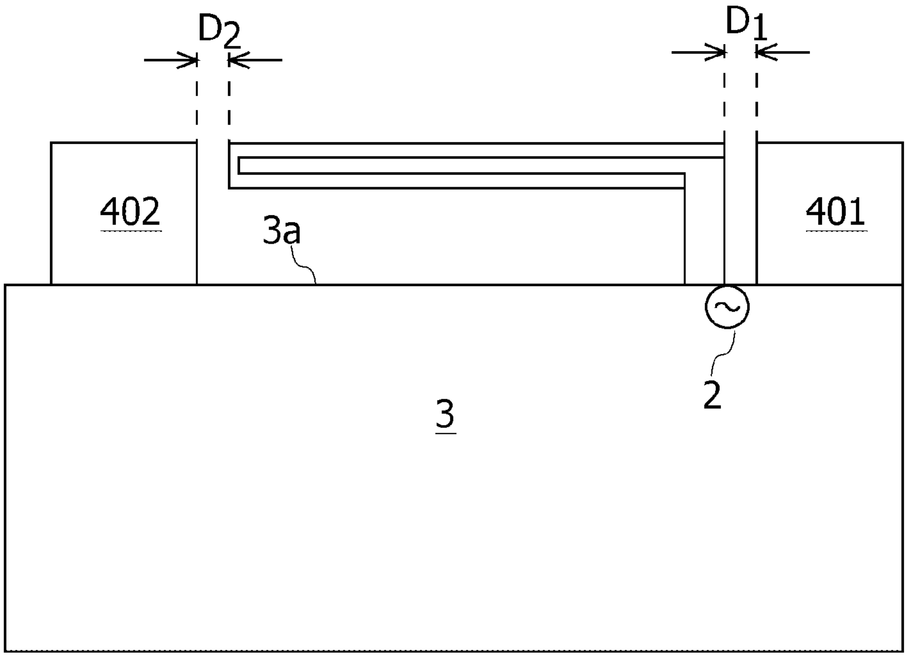
FIG. 10 is a diagram illustrating a state in which a piece of metal is placed in both a vicinity of the feeding point and a vicinity of the folding portion of the antenna.

When mounting an antenna to a wireless communication apparatus, it is expected that a metal object such as a metal frame of the wireless communication apparatus, other electronic components, or the like is often present in a vicinity of the antenna. In consideration thereof, in the present evaluation, a case where a piece of metal is placed in a vicinity of the feeding point of the antenna (schematically shown in FIG. 8), a case where a piece of metal is placed in a vicinity of the folding portion of the antenna (schematically shown in FIG. 9), and a case where a piece of metal is placed in both a vicinity of the feeding point and a vicinity of the folding portion of the antenna (schematically shown in FIG. 10) have also been evaluated. In this case, an interval $D_1$ between a piece of metal 401 placed in the vicinity of the feeding point of the antenna and the first conductor device is assumed to be 1 mm and an interval $D_2$ between a piece of metal 402 placed in the vicinity of the folding portion of the antenna and the folding portion is assumed to be 1 mm. The piece of metal 401 and the piece of metal 402 are grounded by being connected to the ground substrate 3.

First Evaluation

In the first evaluation, an effect of forming a conductor device in a plate shape on radiation efficiency will be evaluated. In the first evaluation, a comparison of radiation efficiency was performed between the first comparative example and the embodiment. FIG. 11 is a diagram showing a result of the first evaluation. Referring to FIG. 11, compared to the radiation efficiency of the antenna 100 according to the first comparative example being −4.5 dB, the radiation efficiency of the antenna 1 according to the embodiment is −3.0 dB. In other words, it can be understood that the antenna 1 according to the embodiment is capable of improving radiation efficiency by 1.5 dB as compared to the antenna 100 according to the first comparative example.

In addition, with the antenna 1 according to the embodiment, radiation efficiency is improved to −2.6 dB when placing the piece of metal 402 in the vicinity of the folding portion. Furthermore, it is to be understood that with the antenna 1 according to the embodiment, radiation efficiency hardly declines even when the piece of metal 401 is placed in the vicinity of the feeding point.

Second Evaluation

In a second evaluation, an effect of connecting the first conductor device to ground and connecting the second conductor device to the feeding point on radiation efficiency will be evaluated. In the second evaluation, a comparison of radiation efficiency was performed between the second comparative example and the fourth comparative example. FIG. 12 is a diagram showing a result of the second evaluation. Referring to FIG. 12, the radiation efficiency of the antenna 100$a$ according to the second comparative example is −4.9 dB and the radiation efficiency of the antenna 120 according to the fourth comparative example is −4.3 dB. In other words, it can be understood that the radiation efficiency is improved by 0.6 dB by forming the first conductor device and the second conductor device in a plate shape. However, it can be understood that placing the piece of metal 402 in the vicinity of the folding portion or placing the piece of metal 401 in the vicinity of the feeding point causes radiation efficiency of the antenna 120 according to a fourth modification in which the first conductor device and the second conductor device are formed in a plate shape to decline. In other words, it can be understood that, by connecting the first conductor device to ground and connecting the second conductor device to the feeding point, unlike the antenna 1 according to the embodiment, an improvement in radiation efficiency due to arranging the pieces of metal 401 and 402 in the vicinity of the folding portion or the vicinity of the feeding point is not to be expected.

Third Evaluation

In a third evaluation, an effect of making the width of the second conductor device larger than the width of the first conductor device on radiation efficiency will be evaluated. In the third evaluation, the first comparative example and the fifth comparative example were evaluated. FIG. 13 is a diagram showing a result of the third evaluation. Referring to FIG. 13, the radiation efficiency of the antenna 100 according to the first comparative example is −4.5 dB and the radiation efficiency of the antenna 130 according to the fifth comparative example is −4.2 dB. In other words, it can be understood that the radiation efficiency is improved by 0.3 dB by making the width of the second conductor device larger than the width of the first conductor device. However, it can be understood that placing the piece of metal 402 in the vicinity of the folding portion or placing the piece of metal 401 in the vicinity of the feeding point causes radiation efficiency of the antenna 130 according to a fifth modification to decline. In other words, it can be understood that, by forming the width of the second conductor device being closer to the ground surface 3*a* to be larger than the width of the first conductor device, unlike the antenna 1 according to the embodiment, an improvement in radiation efficiency due to arranging the pieces of metal 401 and 402 in the vicinity of the folding portion or the vicinity of the feeding point is not to be expected.

Fourth Evaluation

In a fourth evaluation, radiation efficiency of the antenna 110 according to the third comparative example which has also been cited as Japanese Patent Application Laid-open No. 2016-165035 will be evaluated. FIG. 14 is a diagram showing a result of the fourth evaluation. Referring to FIG. 14, it can be understood that the radiation efficiency of the antenna 110 according to the third comparative example is −4.3 dB. In other words, it can be understood that an improvement has been made from the radiation efficiency of the antenna 100 according to the first comparative example illustrated in FIG. 11 or the radiation efficiency of the antenna 100*a* according to the second comparative example illustrated in FIG. 12. However, it can be understood that placing the piece of metal 402 in the vicinity of the folding portion or placing the piece of metal 401 in the vicinity of the feeding point causes radiation efficiency of the antenna 110 according to a third modification to decline. In other words, it can be understood that, by making the distance between the first conductor device and the ground surface 3*a* of the ground substrate 3 and the distance between the second conductor device and the ground surface 3*a* equal to each other, unlike the antenna 1 according to the embodiment, an improvement in radiation efficiency due to arranging the pieces of metal 401 and 402 in the vicinity of the folding portion or the vicinity of the feeding point is not to be expected.

Fifth Evaluation

In a fifth evaluation, with respect to the antenna 1 according to the embodiment, a relationship between a ratio of widths of the first conductor device 12 and the second conductor device 13 and the radiation efficiency of the antenna 1 will be evaluated. FIG. 15 is a diagram illustrating a relationship between a ratio of widths of the first conductor device and the second conductor device and radiation efficiency. In FIG. 15, (width of first conductor device 12: width of second conductor device 13) and radiation efficiency are associated with each other. As is evident from reference to FIG. 15, it can be understood that, making the width of the first conductor device 12 wider as compared to the width of the second conductor device 13 enables radiation efficiency of the antenna 1 to be improved.

According to the first to fourth evaluations, it can be understood that the radiation efficiency of the antenna 1 according to the embodiment illustrated in FIG. 13 of −3.0 dB is higher than the radiation efficiency of the antennas according to any of the comparative examples. In addition, with the antennas according to any of the comparative examples, radiation efficiency declines when the pieces of metal 401 and 402 are arranged in a vicinity of the folding portion or a vicinity of the feeding point. On the other hand, with the antenna 1 according to the embodiment, radiation efficiency can be further enhanced by arranging the pieces of metal 401 and 402 in a vicinity of the folding portion or a vicinity of the feeding point. Note that, in order to enhance radiation efficiency, the interval $D_1$ between the piece of metal 401 and the first conductor device and the interval $D_2$ between the piece of metal 402 and the folding portion are preferably set to λ/50. The pieces of metal 401 and 402 represent an example of the "metal member".

Relationship Between Current Intensity Distribution and Performance of Antenna 1

In order to evaluate a mechanism which enables the antenna 1 according to the embodiment to realize higher radiation efficiency than the antennas according to the comparative examples described above, a simulation of a current distribution in the antennas was performed. First, a current distribution in the antenna 100 according to the first comparative example and a current distribution in the antenna 1 according to the embodiment are compared. In the comparison, current distributions in a state where the pieces of metal 401 and 402 are arranged in the vicinity of the folding portion or the feeding point are compared.

Figure 16:
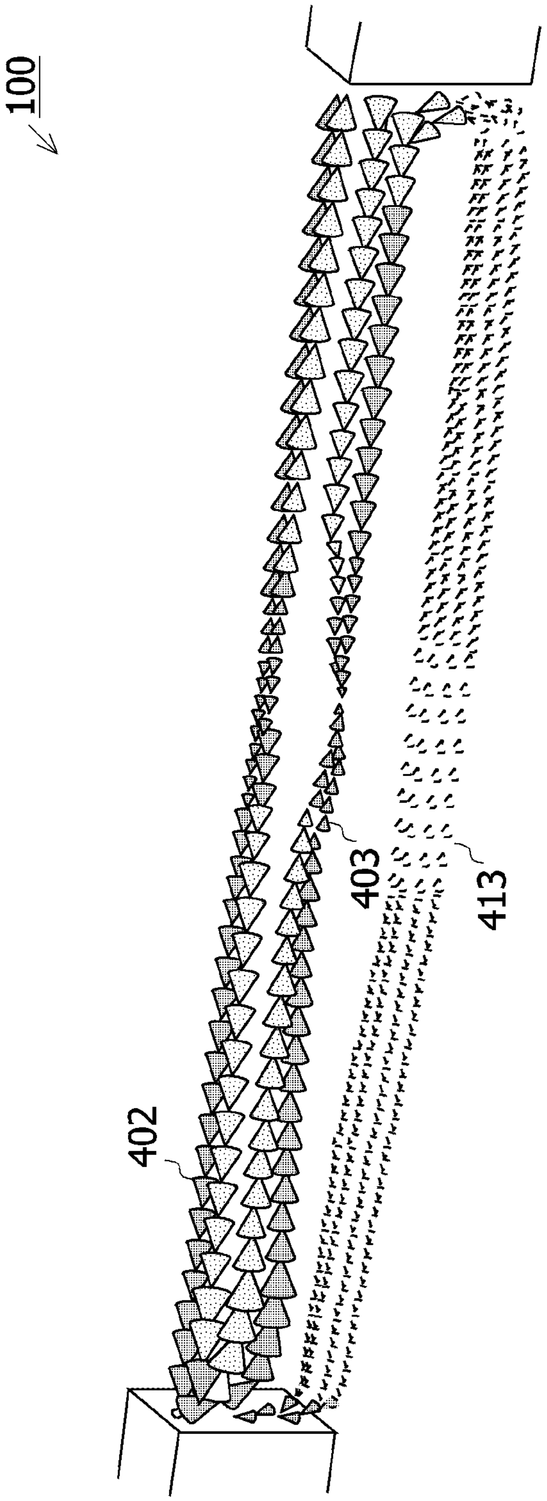
FIG. 16 is a diagram illustrating a current distribution of the antenna according to the first comparative example.
Figure 17:
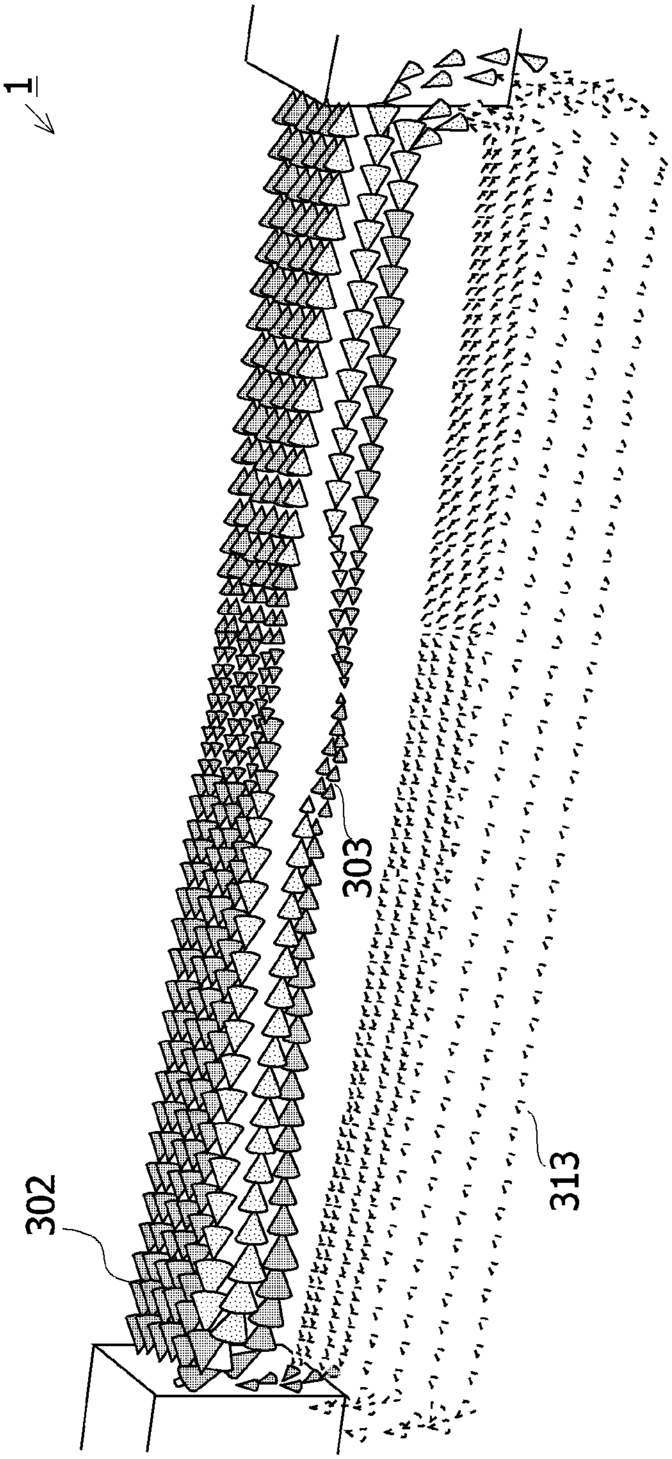
FIG. 17 is a diagram illustrating a current distribution of the antenna according to the embodiment.

FIG. 16 is a diagram illustrating a current distribution of the antenna according to the first comparative example, and FIG. 17 is a diagram illustrating a current distribution of the antenna according to the embodiment. FIGS. 16 and 17 illustrate that the larger a size of a triangle (Δ), the stronger the created current. In FIG. 16, a current distribution 402 illustrates a current distribution on the first conductor device 102, a current distribution 403 illustrates a current distribution on the second conductor device 103, and a current distribution 413 illustrates a current distribution on the ground substrate 3. In addition, in FIG. 17, a current distribution 302 illustrates a current distribution on the first conductor device 12, a current distribution 303 illustrates a current distribution on the second conductor device 13, and a current distribution 313 illustrates a current distribution on the ground substrate 3.

In the current distributions in the antenna 100 illustrated in FIG. 16, it can be understood that a current is distributed in a concentrated manner on the first conductor device 102 and the second conductor device 103 which are formed in a linear shape while a current of which an orientation is opposite to that of the current flowing through the second conductor device 103 is intensely distributed on the ground surface 3*a*. On the other hand, in the current distributions in the antenna 1 illustrated in FIG. 17, it can be understood that a current distribution is dispersed on the first conductor device 12 which is formed wider than the second conductor device 13 and a current which is created on the ground surface 3*a* and of which an orientation is opposite to that of the current flowing through the second conductor device 13 is dispersed over a wider range than the antenna 100 illustrated in FIG. 16.

Figure 18:
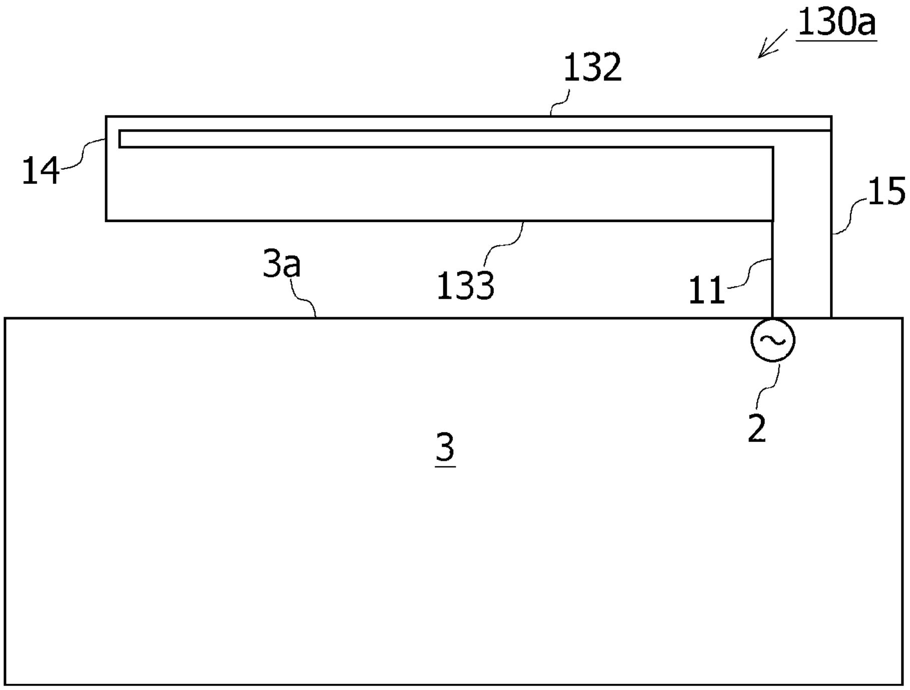
FIG. 18 is a side view schematically showing an example of an antenna according to a sixth comparative example.

Furthermore, with respect to the first conductor device and the second conductor device, current distributions in a case where the conductor device to be made wider is swapped or a case where the conductor device to be connected to the feeding point and the conductor device to be connected to ground are swapped will be evaluated. For this evaluation, an antenna 130*a* (illustrated in FIG. 18) according to a sixth comparative example will be considered which is created by, in the antenna 130 according to the fifth comparative example, connecting the first conductor device 132 to the ground surface 3*a* of the ground substrate 3 with the ground line 15 and connecting the second conductor device 133 to the feeding point 2 by the feed line 11.

In other words, by comparing the antenna 1 according to the embodiment, the antenna 120 according to the fourth comparative example, the antenna 130 according to the fifth comparative example, and the antenna 130*a* according to the sixth comparative example, with respect to the first conductor device and the second conductor device, current distributions in a case where the conductor device to be made wider is swapped or a case where the conductor device to be connected to the feeding point and the conductor device to be connected to ground are swapped will be evaluated.

Figure 19:
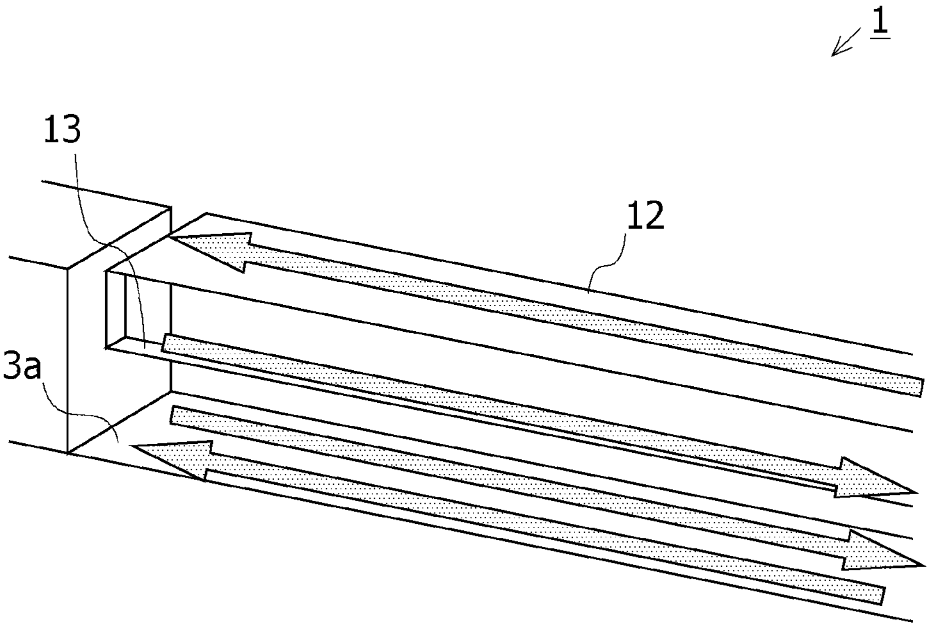
FIG. 19 is a diagram schematically showing an orientation of a current in the antenna according to the embodiment.

FIG. 19 is a diagram schematically showing an orientation of a current in the antenna according to the embodiment. In FIG. 19, an orientation of a current is illustrated by an arrow. As is evident from reference to FIG. 19, a current that flows through the first conductor device 12 and a current that flows through the second conductor device 13 have opposite orientations. In this case, the first conductor device 12 is designed wider than the second conductor device 13 and the first conductor device 12 is connected to the feeding point 2. Consequently, a stronger current is to flow through the first conductor device 12 than the second conductor device 13. Therefore, a current of which an orientation is opposite to that of the current flowing through the first conductor device 12 is also created on the ground surface 3*a* despite the first conductor device 12 being farther away from the ground surface 3*a* than the second conductor device 13. In other words, in the antenna 1 according to the embodiment, a current with a same orientation as the current flowing through the second conductor device 13 is also created on the ground surface 3*a*. On the ground surface 3*a*, an intensity of the current flowing in an orientation which is opposite to that of the current flowing through the second conductor device 13 is to be weakened.

Figure 20:
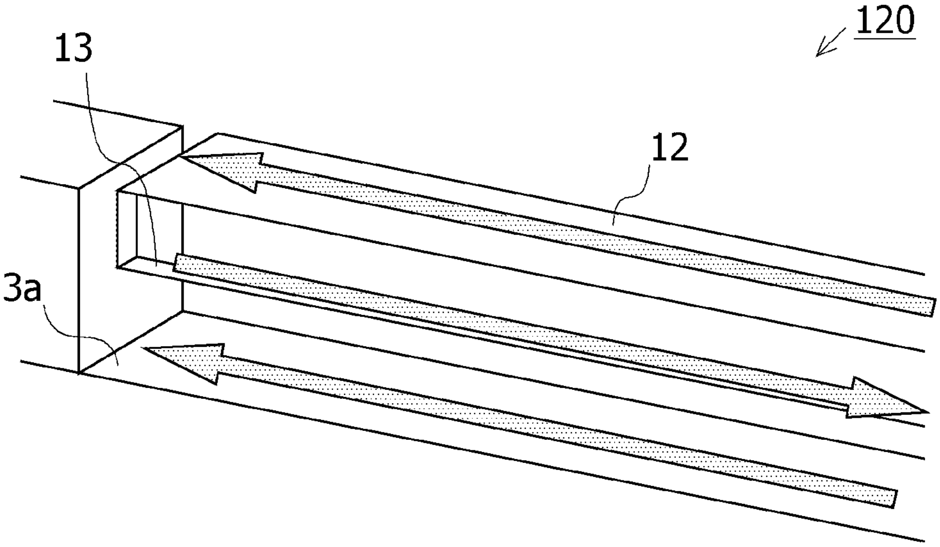
FIG. 20 is a diagram schematically showing an orientation of a current in the antenna according to the fourth comparative example.

FIG. 20 is a diagram schematically showing an orientation of a current in the antenna according to the fourth comparative example. In the antenna 120 according to the fourth comparative example, the first conductor device 12 is connected to the ground surface 3*a* of the ground substrate 3 and the second conductor device 13 is connected to the feeding point 2. Consequently, a stronger current is to flow through the second conductor device 13 than the first conductor device 12. Since the second conductor device 13 is closer to the ground surface 3*a* and a stronger current is to flow through the second conductor device 13 than the first conductor device 12, the influence of the first conductor device 12 with respect to the current flowing through the ground surface 3*a* is reduced as compared to the antenna 1 according to the embodiment. Therefore, due to the ground surface 3*a* being strongly affected by the current flowing through the second conductor device 13, a current of which an orientation is opposite to that of the current flowing through the second conductor device 13 is created on the ground surface 3*a*.

Figure 21:
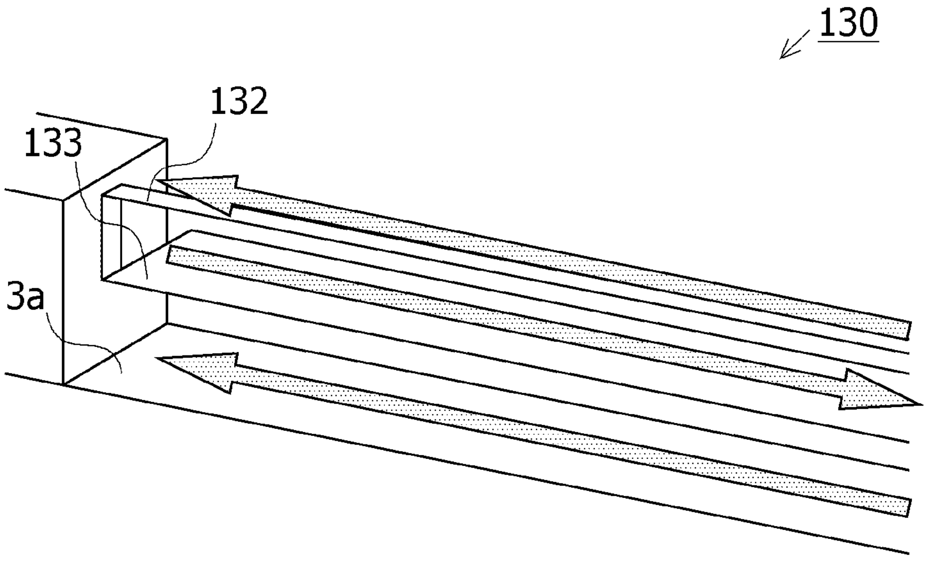
FIG. 21 is a diagram schematically showing an orientation of a current in the antenna according to the fifth comparative example.

FIG. 21 is a diagram schematically showing an orientation of a current in the antenna according to the fifth comparative example. In the antenna 130 according to the fifth comparative example, the second conductor device 133 is designed wider than the first conductor device 132 as described earlier. Consequently, a stronger current more readily flows through the second conductor device 133. In addition, the second conductor device 133 is provided at a position closer to the ground surface 3*a* than the first conductor device 132. Therefore, due to the ground surface 3*a* being strongly affected by the current flowing through the second conductor device 133, a current of which an orientation is opposite to that of the current flowing through the second conductor device 133 is created on the ground surface 3*a*.

Figure 22:
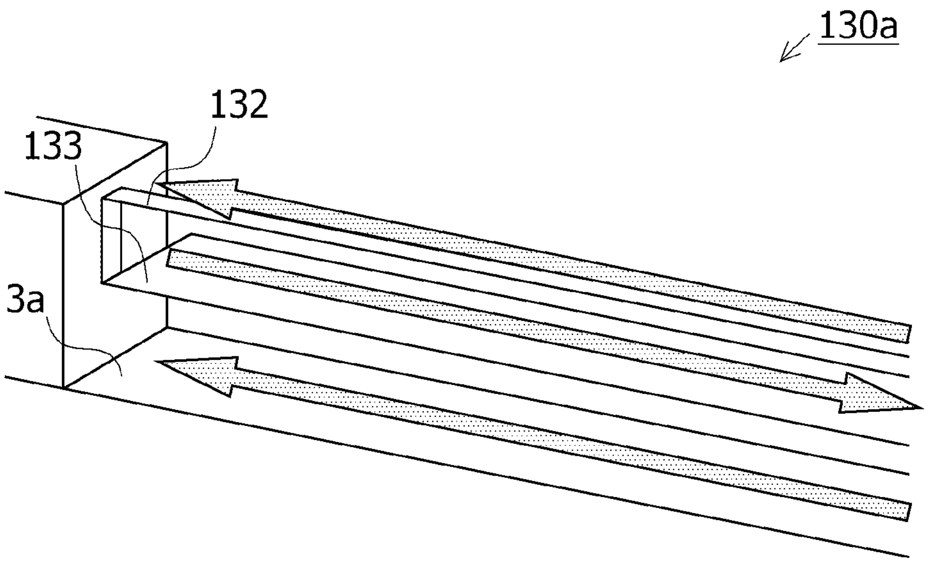
FIG. 22 is a diagram schematically showing an orientation of a current in the antenna according to the sixth comparative example.

FIG. 22 is a diagram schematically showing an orientation of a current in the antenna according to the sixth comparative example. In the antenna 130*a* according to the sixth comparative example, the first conductor device 132 is connected to the ground surface 3*a* and the second conductor device 133 is connected to the feeding point 2 as described earlier. Consequently, in the antenna 130*a*, a stronger current more readily flows through the second conductor device 133 than in the antenna 130 according to the fifth comparative example. Therefore, due to the ground surface 3*a* being strongly affected by the current flowing through the second conductor device 133, a current of which an orientation is opposite to that of the current flowing through the second conductor device 133 is created on the ground surface 3*a*.

In an antenna, when orientations of a current flowing through the second conductor device and a current flowing through the ground surface 3*a* of the ground substrate 3 are opposite orientations, generated heat loss causes radiation efficiency of the antenna to decline. In all of the fourth comparative example, the fifth comparative example, and the sixth comparative example, due to a current which flows through the ground surface 3*a* and of which an orientation is opposite to that of the current which flows through the second conductor device, radiation efficiency declines due to heat loss. On the other hand, in the antenna 1 according to the embodiment, since intensity of the current which flows in an orientation opposite to that of the current flowing through the second conductor device 13 is weakened as described above, a decline in radiation efficiency due to heat loss can be reduced as compared to the fourth comparative example, the fifth comparative example, and the sixth comparative example. In other words, the antenna 1 according to the embodiment is capable of realizing higher radiation efficiency than the antennas according to any of the fourth comparative example, the fifth comparative example, and the sixth comparative example.

Advantageous Effect of Embodiment

In the antenna 1 according to the embodiment, the first conductor device 12 is connected to the feeding point 2 and, at the same time, a width of the first conductor device 12 is designed wider than that of the second conductor device 13. As a result, a stronger current is to flow through the first conductor device 12 than the second conductor device 13 and a current which flows in an orientation opposite to that of the current flowing through the first conductor device 12 can be created on the ground surface 3*a*. Accordingly, on the ground surface 3*a*, a current flowing in an orientation which is opposite to that of the current flowing through the second conductor device 13 is to be weakened and a decline in radiation efficiency due to heat loss can be suppressed.

In addition, according to the first to fourth evaluations, when the pieces of metal 401 and 402 are present in a vicinity of an antenna, while radiation efficiency declines in antennas according to comparative examples, the antenna 1 according to the embodiment is capable of further enhancing radiation efficiency.

First Modification

Figure 23:
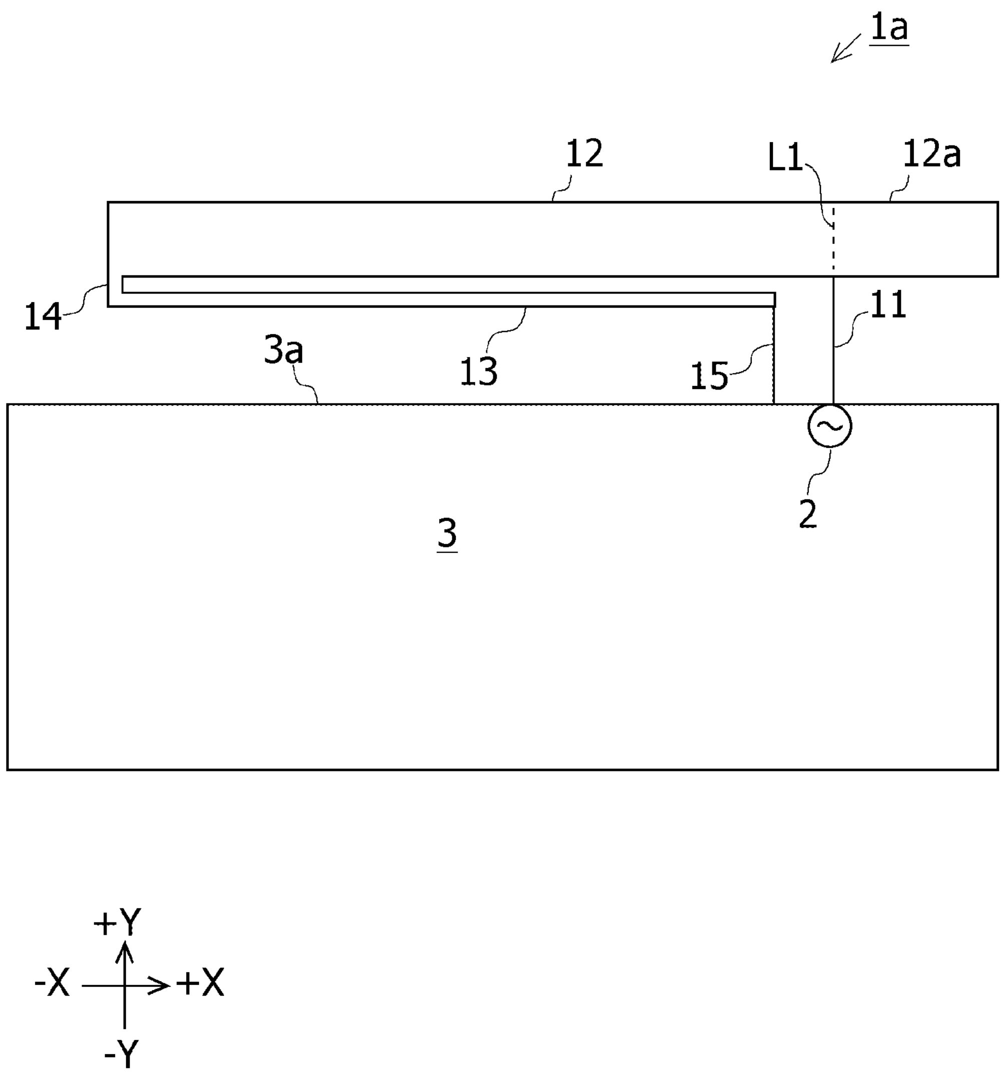
FIG. 23 is a diagram schematically showing an antenna according to a first modification.

The antenna 1 according to the embodiment can be modified in various ways. FIG. 23 is a diagram schematically showing an antenna according to a first modification. An antenna 1*a* according to the first modification differs from the antenna 1 according to the embodiment in that the antenna 1*a* further includes a third conductor device 12*a* which extends in a +X direction from the +X-side end of the first conductor device 12. A dotted line L1 in FIG. 23 schematically shows a boundary between the first conductor device 12 and the third conductor device 12*a*. A length (a length in the X direction) of the third conductor device 12*a* may be set to ¼ or less of a wavelength $\lambda_3$ of a radio wave which resonates the third conductor device 12*a*. By adopting such a design, the third conductor device 12*a* can be operated as a monopole antenna which resonates with a radio wave with a wavelength of $\lambda_3$. In the first modification, the piece of metal 402 may be arranged in a vicinity of the folding portion 14. For example, the piece of metal 402 may be an antenna which differs from the antenna 1*a*.

Second Modification

Figure 24:
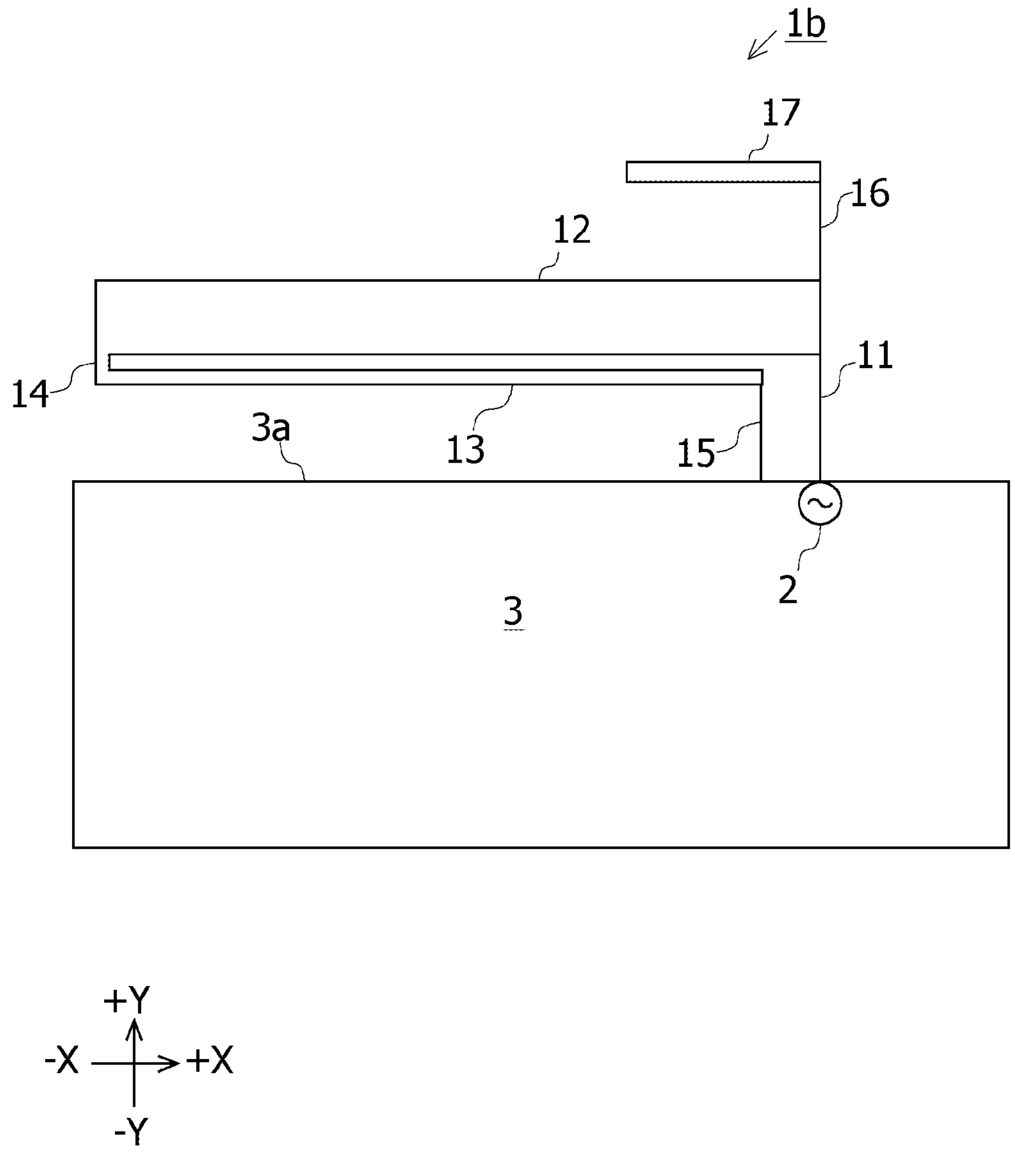
FIG. 24 is a diagram schematically showing an antenna according to a second modification.

FIG. 24 is a diagram schematically showing an antenna according to a second modification. An antenna 1*b* according to the second modification differs from the antenna 1 according to the embodiment in that the antenna 1*b* further includes a fourth conductor device 17 which is connected to the first conductor device 12 via a connecting line 16 which extends in a +Y direction from the X-side end of the first conductor device 12 and which extends in the −X direction from the connecting line 16. A length (a length in the X direction) of the fourth conductor device 17 may be set to ¼ or less of a wavelength $\lambda_4$ of a radio wave which resonates the fourth conductor device 17. By adopting such a design, the fourth conductor device 17 can be operated as a monopole antenna which resonates with a radio wave with a wavelength of $\lambda_4$. The fourth conductor device 17 is an example of the "third conductor device".

Third Modification

Figure 25:
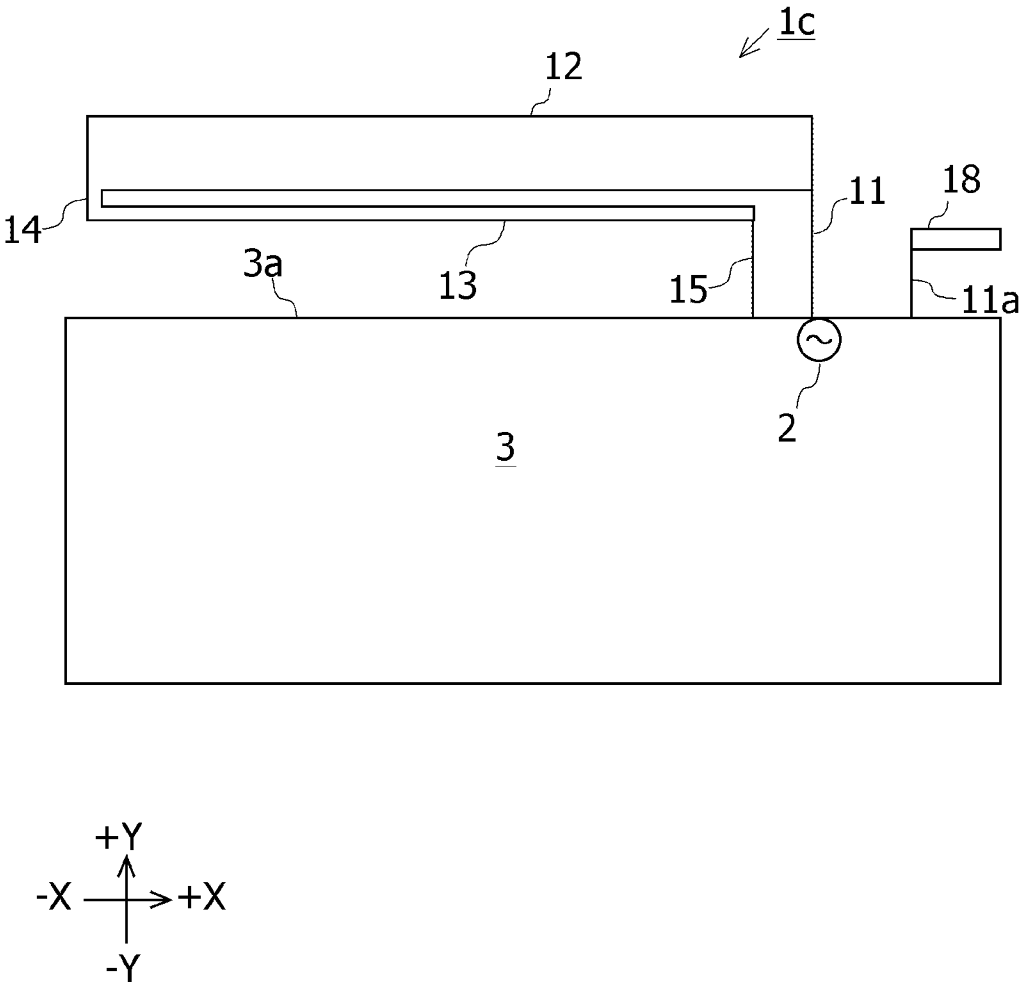
FIG. 25 is a diagram schematically showing an antenna according to a third modification.

FIG. 25 is a diagram schematically showing an antenna according to a third modification. An antenna 1*c* according to the third modification differs from the antenna 1 according to the embodiment in that the antenna 1*c* is provided with a fifth conductor device 18 which is connected to the ground surface 3*a* by a ground line 11*a*. The fifth conductor device 18 is not in contact with any of the first conductor device 12, the second conductor device 13, the folding portion 14, the feed line 11, and the ground line 15. A length (a length in the X direction) of the fifth conductor device 18 may be set to ¼ or less of a wavelength $\lambda_5$ of a radio wave which resonates the fifth conductor device 18. By adopting such a design, the fifth conductor device 18 can be operated as a monopole antenna which resonates with a radio wave with a wavelength of $\lambda_5$. The fifth conductor device 18 is an example of the "fourth conductor device".

Fourth Modification

Figure 26:
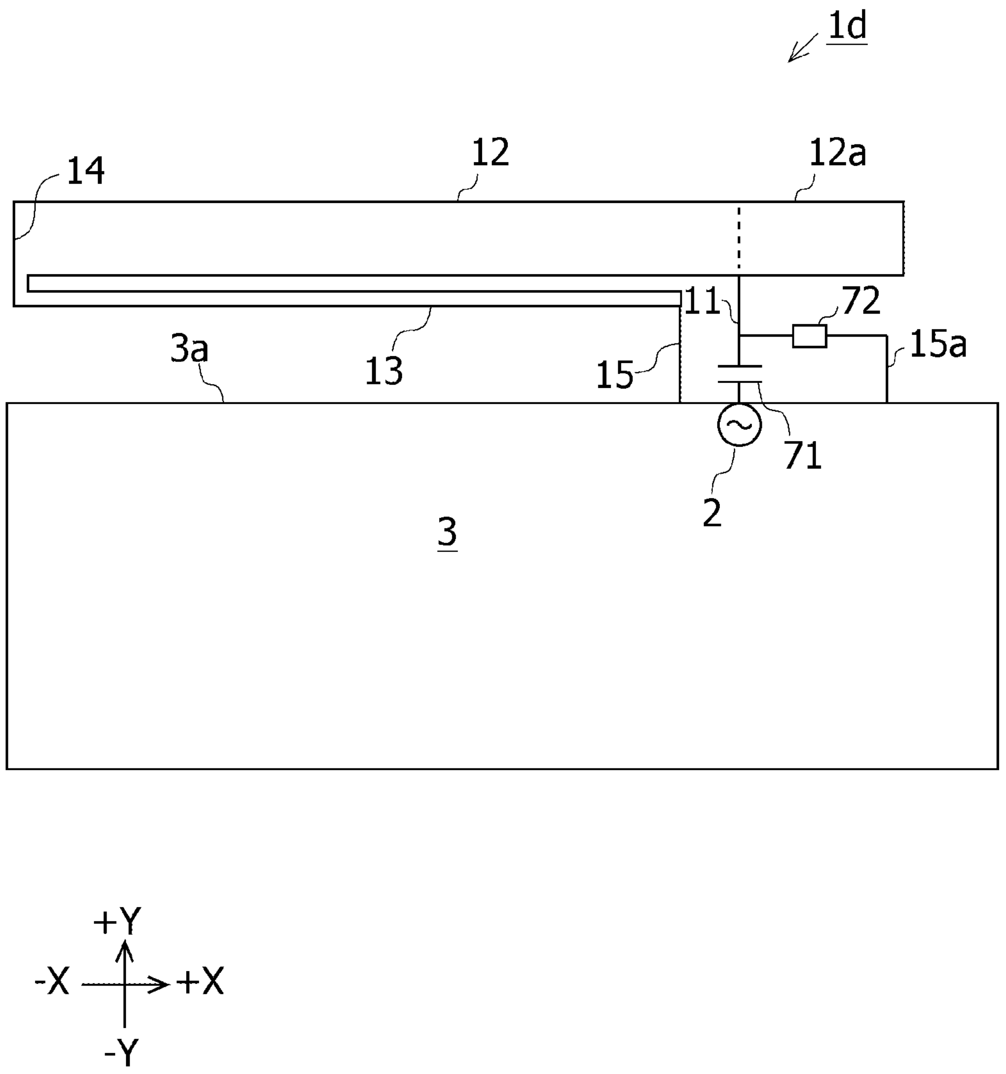
FIG. 26 is a diagram schematically showing an antenna according to a fourth modification.

FIG. 26 is a diagram schematically showing an antenna according to a fourth modification. In an antenna 1*d* according to the fourth modification, a capacitor 71 is provided on the feed line 11. In addition, in the feed line 11, a ground line 15*a* is provided which branches from between the capacitor 11 and the first conductor device 12 and which is connected to the ground surface 3*a*. An inductor 72 is provided on the ground line 15*a*. For example, the capacitor 71 is a loading coil. In addition, for example, the inductor 72 is an extension inductor. By appropriately determining a capacitance of the capacitor 71 and an inductance of the inductor 72, a wavelength of a radio wave with which the antenna 1*d* resonates can be changed.

Fifth Modification

Figure 27:
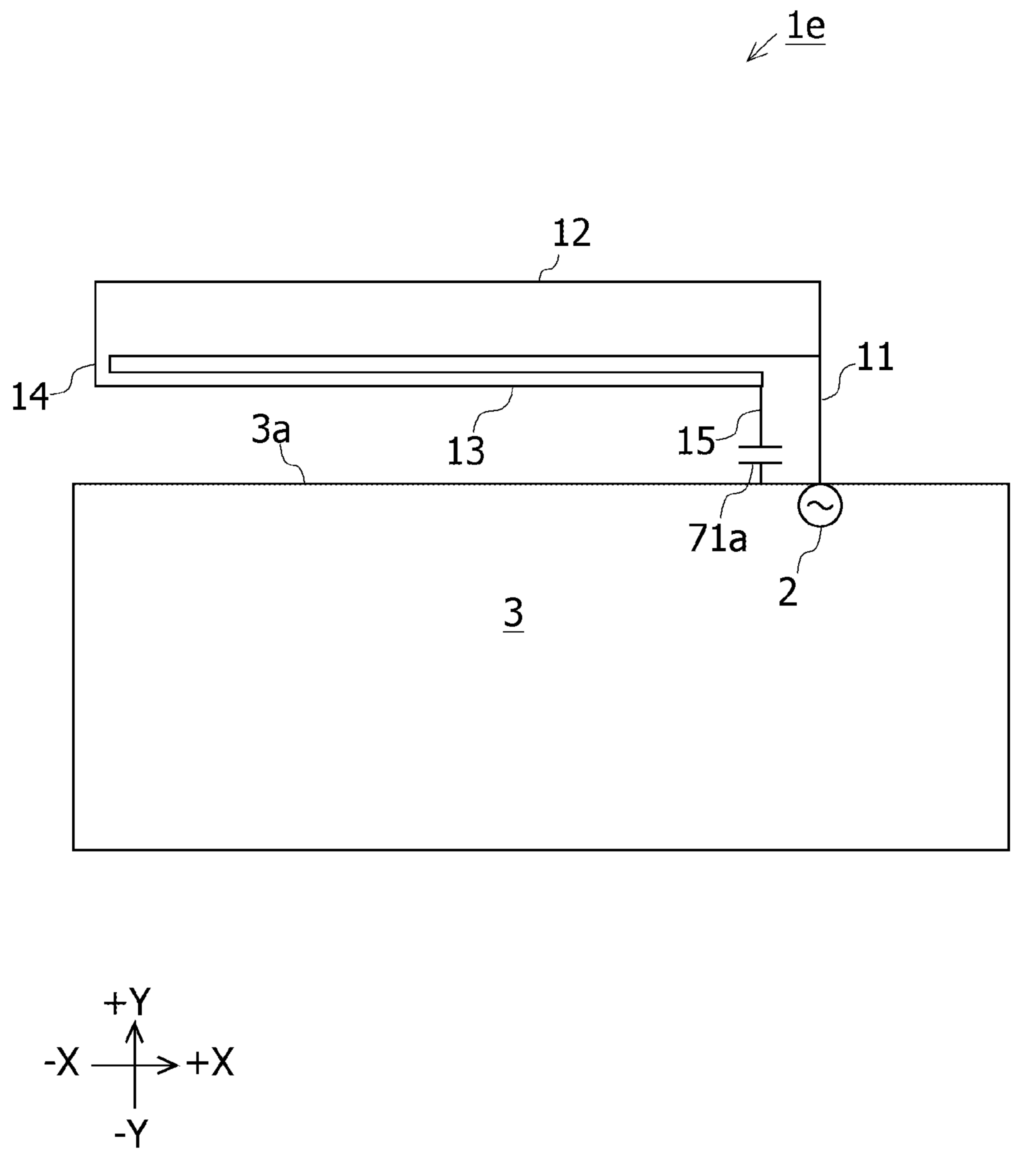
FIG. 27 is a diagram schematically showing an antenna according to a fifth modification.

FIG. 27 is a diagram schematically showing an antenna according to a fifth modification. In an antenna 1*e* according to the fifth modification, a capacitor 71*a* is provided on the ground line 15. In the fifth modification, by appropriately determining a capacitance of the capacitor 71*a*, a wavelength of a radio wave with which the antenna 1*e* resonates can be changed.

Sixth Modification

Figure 28:
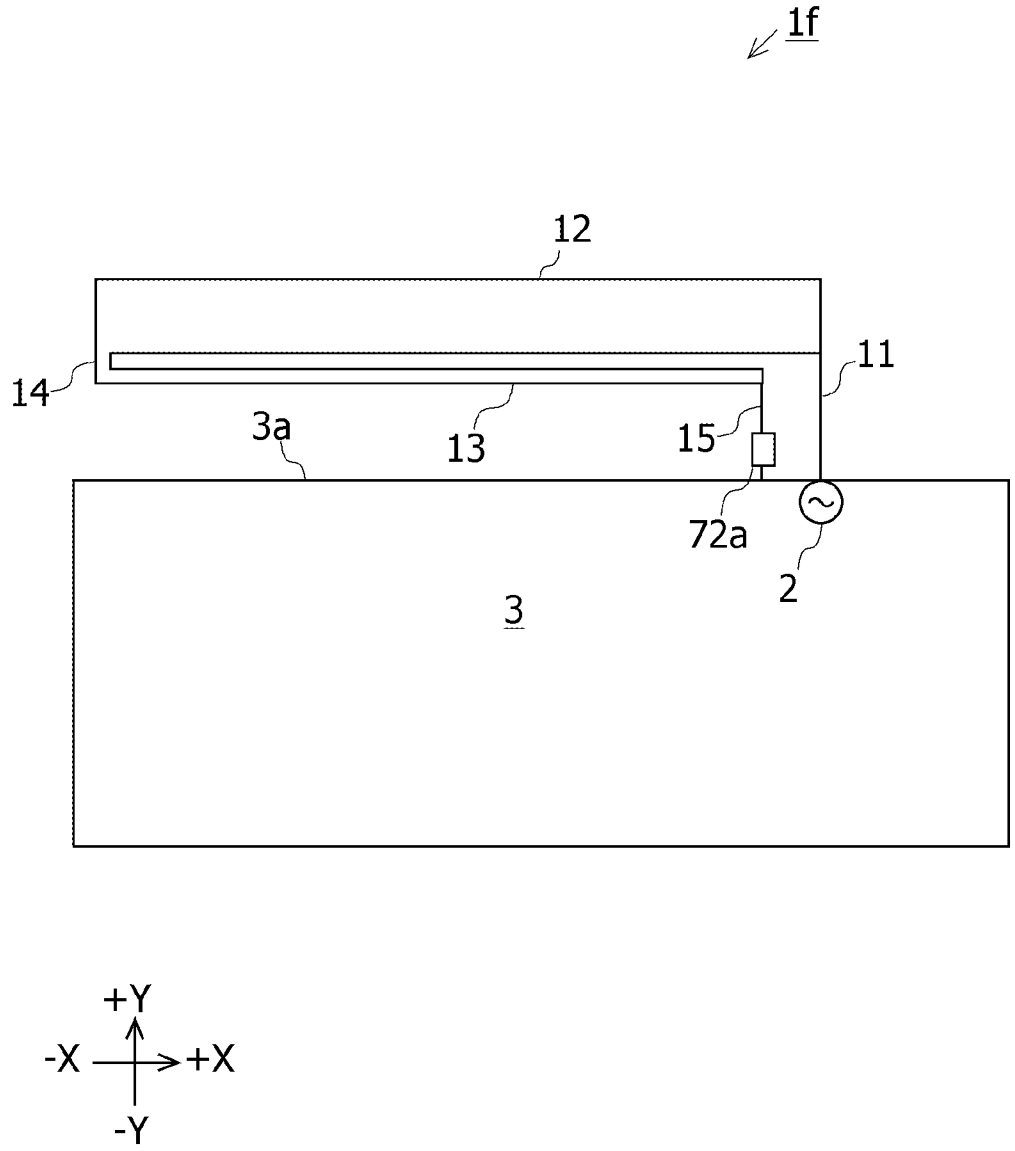
FIG. 28 is a diagram schematically showing an antenna according to a sixth modification.

FIG. 28 is a diagram schematically showing an antenna according to a sixth modification. In an antenna 1*f* according to the sixth modification, an inductor 72*a* is provided on the ground line 15. In the sixth modification, by appropriately determining an inductance of the inductor 72*a*, a wavelength of a radio wave with which the antenna 1*f* resonates can be changed.

Seventh Modification

Figure 29:
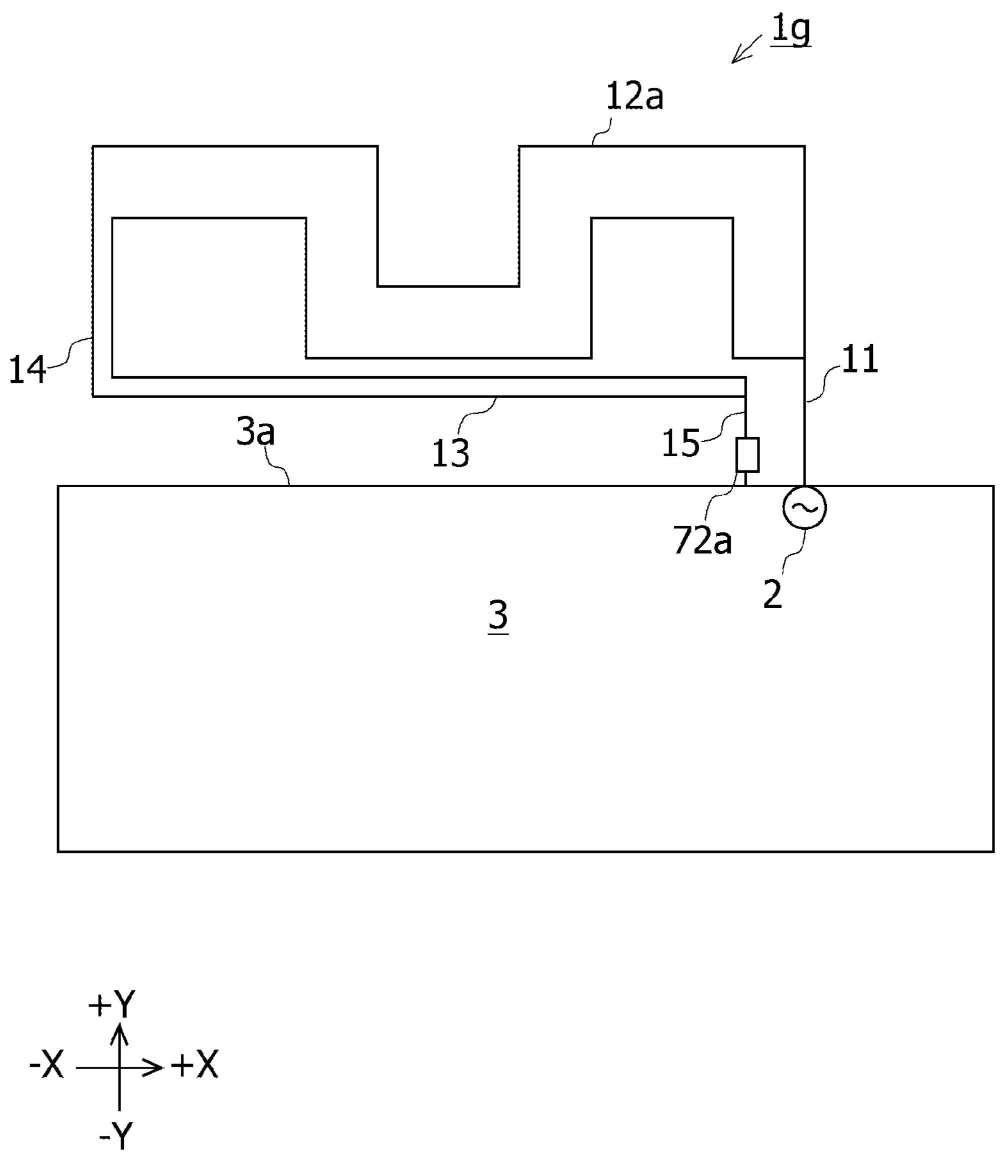
FIG. 29 is a diagram schematically showing an antenna according to a seventh modification.

FIG. 29 is a diagram schematically showing an antenna according to a seventh modification. In an antenna 1*g* according to a seventh modification, the first conductor device 12*a* is given a meander shape. Although the first conductor device 12*a* is given a meander shape in FIG. 29, alternatively, the second conductor device 13 may be given a meander shape or parts of the first conductor device 12 and the second conductor device 13 may be given a meander shape. Adopting a meander shape enables the antenna 1*g* to be downsized.

Application Example

Figure 30:
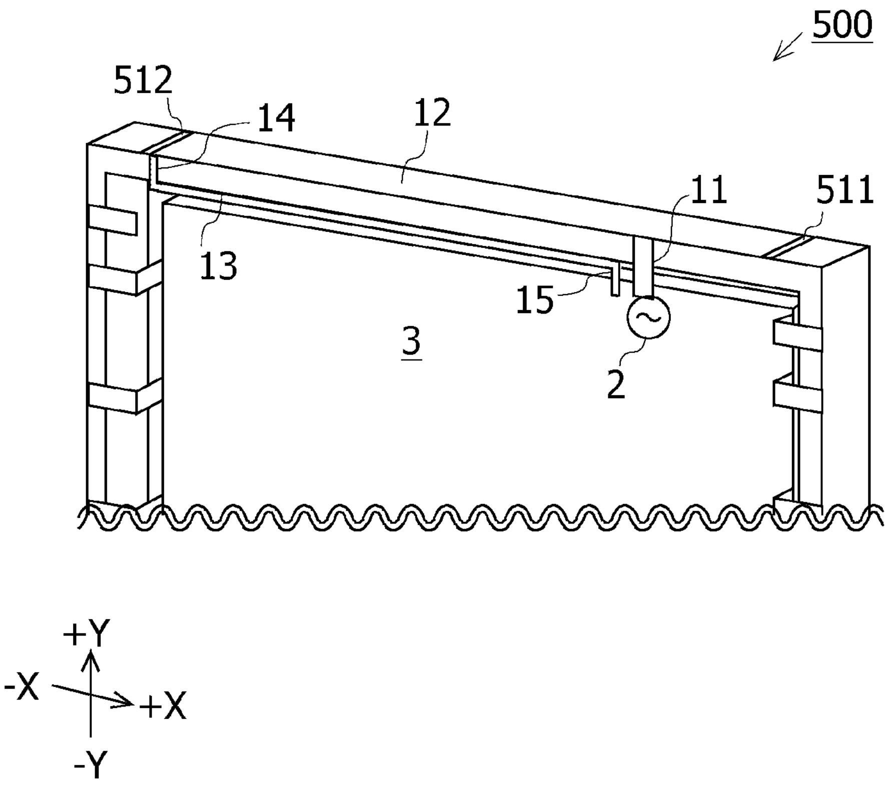
FIG. 30 is a diagram illustrating a configuration in which the antenna according to the embodiment is applied to a smartphone.

FIG. 30 is a diagram illustrating a configuration in which the antenna according to the embodiment is applied to a smartphone. FIG. 30 illustrates a state where a display-side exterior of a smartphone 500 has been removed. In the smartphone 500, a side surface is surrounded by a frame-like metal frame 510. The ground substrate 3 is provided in a region defined by the metal frame 510. In the smartphone 500, a region partitioned by slits 511 and 512 among the metal frame 510 is used as the first conductor device 12. In addition, the second conductor device 13 can be formed by a conductor pattern on a flexible substrate arranged inside the region defined by the metal frame 510 or by Laser Direct Structuring (LDS).

As described earlier, radiation efficiency of the antenna 1 can be enhanced due to the presence of metal in a vicinity of the feeding point 2 or a vicinity of the folding portion 14. Therefore, in the smartphone 500 according to the application example, the radiation efficiency of the antenna 1 can be enhanced due to the present of the metal frame 510 in the vicinity of the antenna 1. In addition to the smartphone 500, the antenna 1 according to the embodiment can be applied to wireless communication apparatuses such as tablet computers, mobile phones, and vehicle-mounted antennas.

Figure 31:
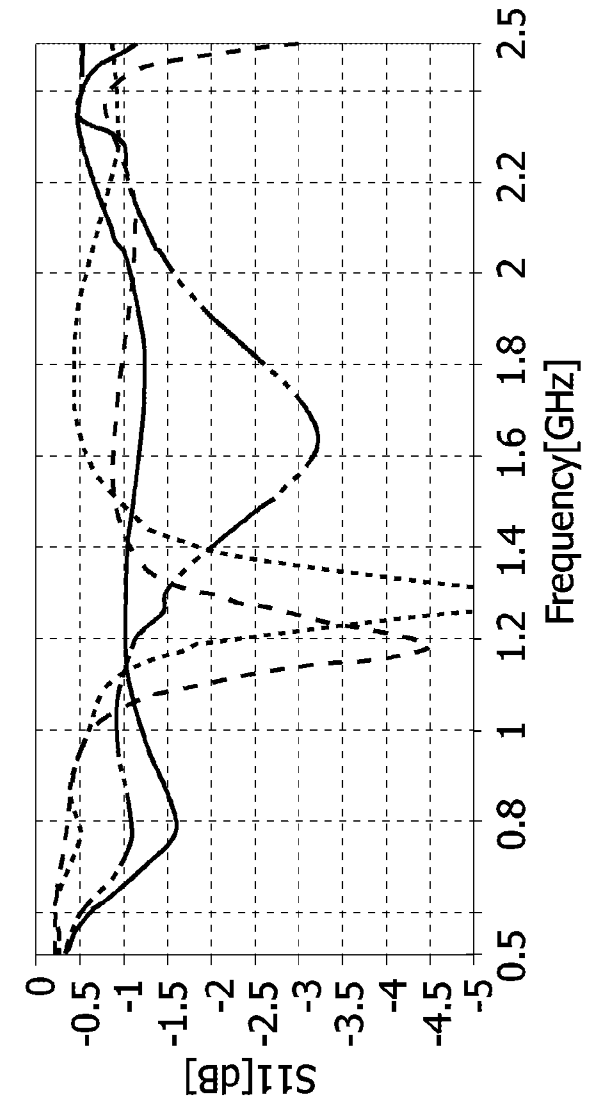
FIG. 31 is a diagram illustrating S11 of an antenna mounted to a smartphone according to an application example.
Figure 32:
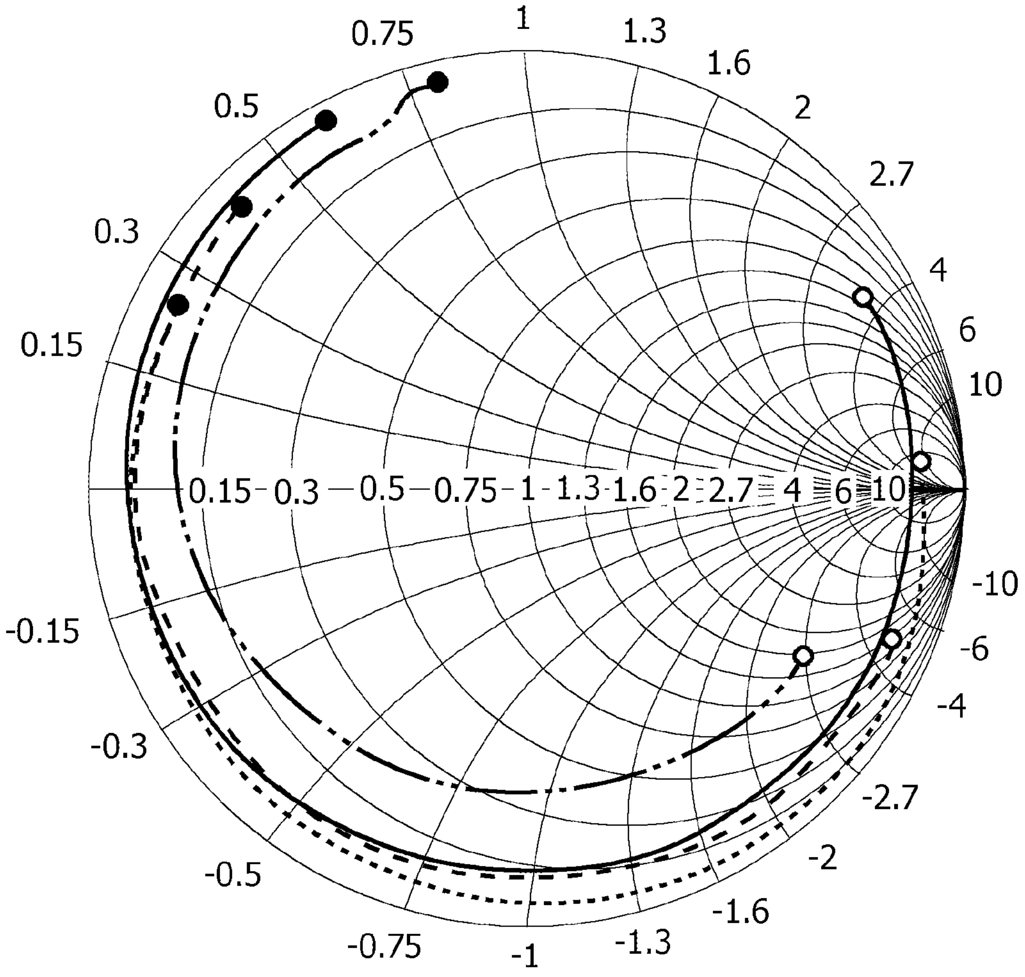
FIG. 32 is a diagram illustrating a Smith chart of the antenna mounted to the smartphone according to the application example.

FIG. 31 is a diagram illustrating S11 of an antenna mounted to a smartphone according to an application example. In addition, FIG. 32 is a diagram illustrating a Smith chart of the antenna mounted to the smartphone according to the application example. FIGS. 31 and 32 illustrate a case where an antenna is not provided with a matching circuit. For reference's sake, FIGS. 31 and 32 also illustrate data of a case where the antenna 1 is not mounted to the smartphone 500 (in other words, a case where the metal frame 510 is not present in the vicinity of the antenna 1) and data of the antenna 100 according to the first comparative example in which widths of the first conductor device 12 and the second conductor device 13 are set equal to each other. In FIGS. 31 and 32, a double dot chain line illustrates data of a case where the antenna 1 is mounted to the smartphone 500. In addition, a solid line illustrates data of a case where the metal frame 510 is not present in the vicinity of the antenna 1. Among two dotted lines, a dotted line depicted by large dots illustrates data of a case where the antenna 100 is mounted to the smartphone 500. Among the two dotted lines, a dotted line depicted by small dots illustrates data of a case where the metal frame 510 is not present in the vicinity of the antenna 100.

As is evident from reference to FIG. 31, in a case where the antenna 1 is mounted to the smartphone 500 and a case where the metal frame 510 is not present in the vicinity of the antenna 1, frequencies at which S11 drops are both in the vicinity of 1.6 GHz. On the other hand, it can be understood that, in a case where the antenna 100 is mounted to the smartphone 500 and a case where the metal frame 510 is not present in the vicinity of the antenna 100, frequencies at which S11 drops have shifted to higher frequencies than 1.6 GHz.

In addition, as is evident from reference to FIG. 32, it can be understood that, in all of a case where the metal frame 510 is not present in a vicinity of the antenna 1, a case where the antenna 100 is mounted to the smartphone 500, and a case where the metal frame 510 is not present in a vicinity of the antenna 100, radiation resistance has declined as compared to a case where the antenna 1 is mounted to the smartphone 500.

From FIGS. 31 and 32, it can be understood that radiation resistance can be increased by placing a piece of metal in a vicinity of the antenna 1. It can also be understood that, by designing the first conductor device 12 to be wider than the second conductor device 13, a resonating frequency can be shifted and radiation resistance can be increased.

Figure 33:
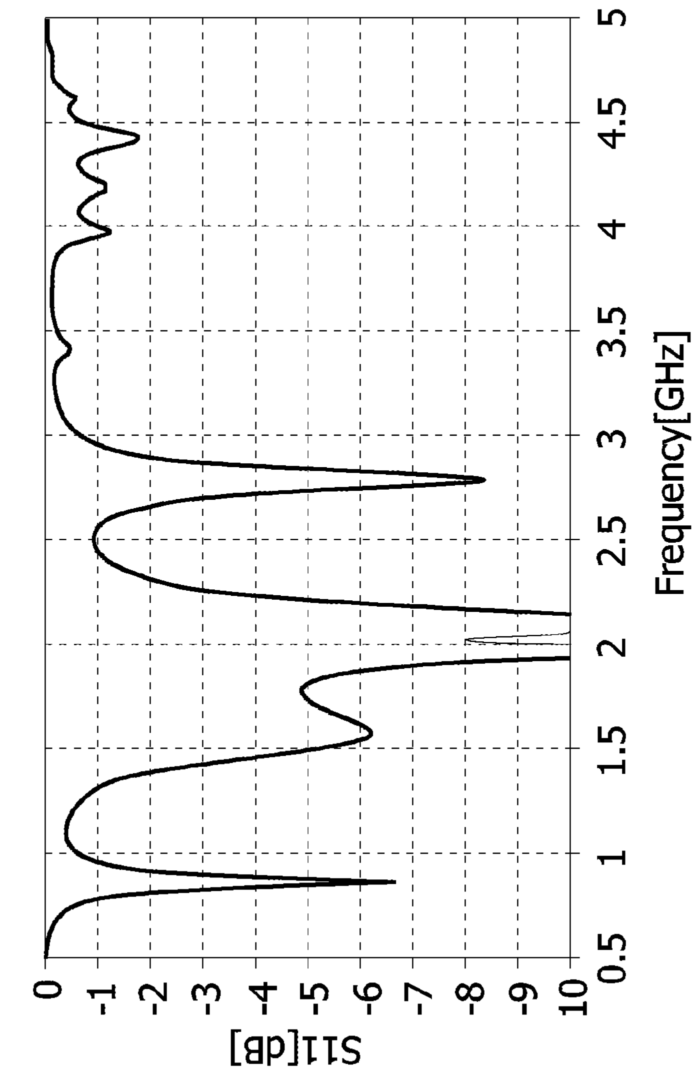
FIG. 33 is a diagram illustrating S11 of an antenna mounted to a smartphone according to an application example.
Figure 34:
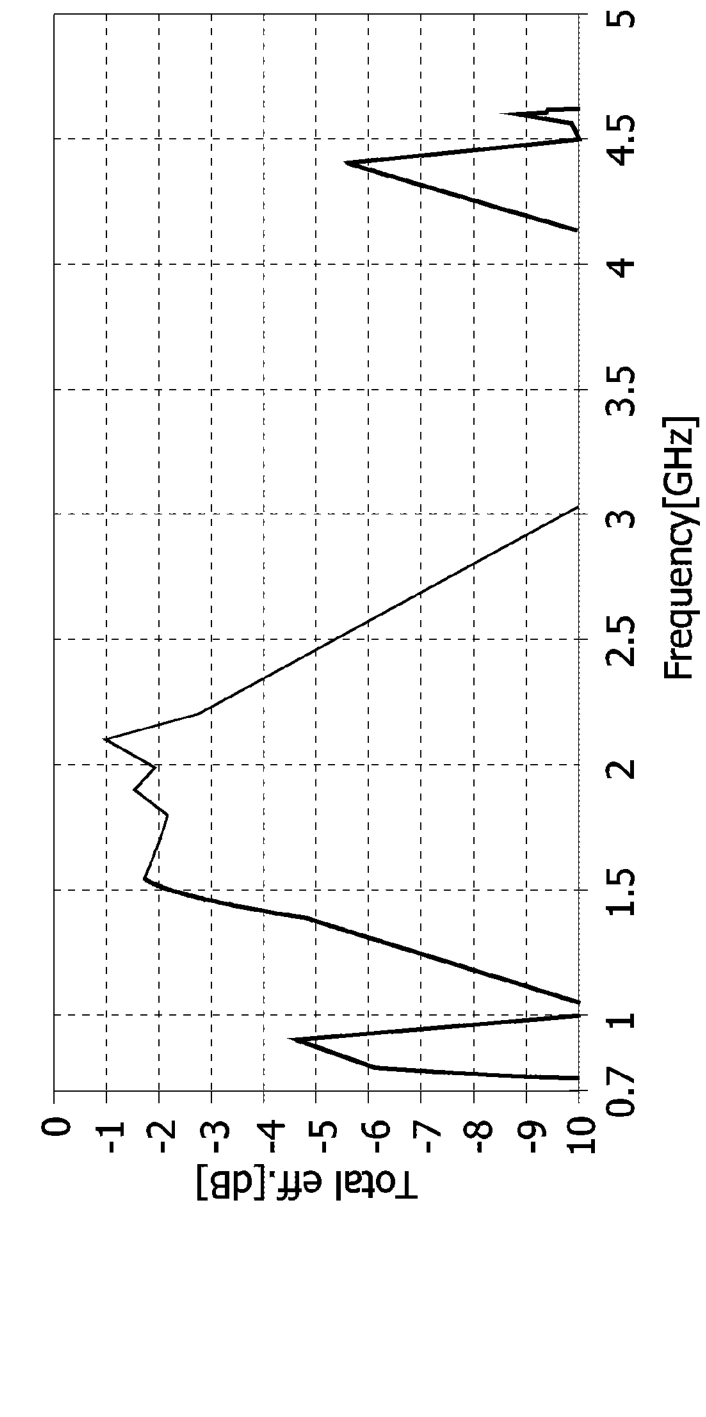
FIG. 34 is a diagram illustrating total efficiency of the antenna mounted to the smartphone according to the application example.

FIG. 33 is a diagram illustrating S11 of an antenna mounted to a smartphone according to an application example. In addition, FIG. 34 is a diagram illustrating total efficiency of the antenna mounted to the smartphone according to the application example. FIGS. 33 and 34 illustrate a case where the antenna 1 is provided with a matching circuit. An ordinate in FIG. 33 illustrates 511 (dB) while an abscissa illustrates frequency (GHz). An ordinate in FIG. 34 illustrates total efficiency (dB) while an abscissa illustrates frequency (GHz).

With reference to FIGS. 33 and 34, with the antenna 1, the graph of S11 bottoms out near 1.5 GHz while the graph of total efficiency peaks near 1.5 GHz. In other words, it can be understood that the antenna 1 exhibits preferable performance with respect to frequencies near 1.5 GHz. Note that total efficiency near 1.5 GHz when the antennas cited as the respective comparative examples described earlier are applied to the smartphone 500 is around −8 dB. On the other hand, total efficiency near 1.5 GHz when the antenna 1 is applied to the smartphone 500 is −2 dB. In other words, it can be understood that radiation efficiency is improved by around 6 dB with the antenna 1 at frequencies near 1.5 GHz over the antennas according to the respective comparative examples.

The embodiment and the modifications disclosed above can be combined with each other.

The disclosed technique enables a reduction in radiation efficiency of an antenna to be suppressed even when metal is present in a vicinity of the antenna.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An antenna apparatus, comprising:

a ground substrate;

a feeding point provided on the ground substrate;

a first conductor device of which one end is electrically connected to the feeding point and which has a plate shape being parallel to the ground substrate;

a second conductor device which is arranged between the first conductor device and the ground substrate, of which one end is electrically connected to the ground substrate, and which has a plate shape being parallel to the ground substrate; and a connecting portion which electrically connects another end of the first conductor device and another end of the second conductor device to each other, wherein a width of the first conductor device is wider than a width of the second conductor device, and lengths of the first conductor device and the second conductor device are ½ of a wavelength of a radio wave for operating the antenna apparatus, wherein a grounded metal member is further provided at a distance of 1/50 or less of the wavelength of the radio wave for operating the antenna apparatus from at least one of the one end of the first conductor device and the connecting portion.

2. The antenna apparatus according to claim 1, wherein a length of the connecting portion is 1/50 or less of the wavelength of the radio wave for operating the antenna apparatus.

3. The antenna apparatus according to claim 1, wherein at least one of an inductor and a capacitor is provided between the feeding point and the first conductor device.

4. The antenna apparatus according to claim 1, wherein at least one of an inductor and a capacitor is provided between the second conductor device and the ground substrate.

5. The antenna apparatus according to claim 1, wherein the antenna apparatus is mounted to a mobile terminal apparatus, and at least a part of the first conductor device is formed by a metal frame which constitutes an exterior of the mobile terminal apparatus.

6. The antenna apparatus according to claim 1, wherein the antenna apparatus is mounted to a mobile terminal apparatus, and at least a part of the second conductor device is formed using Laser Direct Structuring (LDS) or a flexible substrate.

7. The antenna apparatus according to claim 1, wherein at least one of the first conductor device and the second conductor device is formed in a meander shape.

8. The antenna apparatus according to claim 1, further comprising a third conductor device which is connected to the one end of the first conductor device and which has a plate shape being parallel to the ground substrate, wherein a length of the third conductor device is ¼ or less of a wavelength of a radio wave for operating the third conductor device as an antenna.

9. The antenna apparatus according to claim 8, wherein at least one of an inductor and a capacitor is provided between the feeding point and the third conductor device.

10. The antenna apparatus according to claim 1, further comprising a fourth conductor device being connected to the ground substrate, wherein a length of the fourth conductor device is ¼ or less of a wavelength of a radio wave for operating the fourth conductor device as an antenna.

11. A wireless communication apparatus mounted with the antenna apparatus according to claim 1.

12. A wireless communication apparatus mounted with the antenna apparatus according to claim 1, wherein the metal member is an exterior of the wireless communication apparatus.

* * * * *